(12) United States Patent
Asano et al.

(10) Patent No.: US 6,794,460 B2
(45) Date of Patent: Sep. 21, 2004

(54) PRODUCTION PROCESS AND USE FOR TRANSPARENT HEAT-RESISTANT RESIN

(75) Inventors: Hideo Asano, Osaka (JP); Kazumi Fujioka, Ibo-gun (JP)

(73) Assignee: Nippon Shokubai Co., Ltd., Osaka (JP)

(*) Notice: Subject to any disclaimer, the term of this patent is extended or adjusted under 35 U.S.C. 154(b) by 0 days.

(21) Appl. No.: 10/295,657

(22) Filed: Nov. 15, 2002

(65) Prior Publication Data

US 2003/0134988 A1 Jul. 17, 2003

Related U.S. Application Data

(62) Division of application No. 09/453,325, filed on Dec. 2, 1999, now abandoned.

(30) Foreign Application Priority Data

Dec. 9, 1998 (JP) .......................................... 10-350338
Aug. 27, 1999 (JP) .......................................... 11-242272

(51) Int. Cl.$^7$ .................................................. C08F 8/16
(52) U.S. Cl. ..................... 525/328.8; 525/340; 525/353
(58) Field of Search ............................. 545/328.8, 340, 545/153; 525/330.6; 528/501, 503, 487

(56) References Cited

U.S. PATENT DOCUMENTS 5,763,524 A 6/1998 Arkens et al.
2002/0106568 A1 * 8/2002 Asano et al. ................. 430/18

FOREIGN PATENT DOCUMENTS

| GB | 849669 | 9/1960 |
|---|---|---|
| GB | 1176178 | 1/1970 |
| GB | 1 327 267 | 8/1973 |
| JP | 09-012641 | 1/1997 |
| JP | 09-033736 | 7/1997 |
| JP | 9-241323 A | 9/1997 |
| JP | 09-258042 | 10/1997 |
| JP | 9-263616 A | 10/1997 |

OTHER PUBLICATIONS

Powell et al., "Post–Lactonization of Vinyl Polymers Containing Pendent Ester and Hydroxymethyl Groups." Polymer Preprints, vol. 8 (No. 1), p. 576–581, (1967).
Ueda et al., "Radical–Initiated Homopolymerization and Copolymerization of Ethyl a–Hydroxymethylacrylate," Journal of Polymer Science: Part A: Polymer Chemistry, vol. 27, p. 751–762, (1989).
Kress et al., "Copolymer of Styrene and Methyl a–(Hydroxymethyl) acrylate: Reactivity Ratios, Physical Behaivor, and Spectral Properties," Macromolecules, vol. 22 (No. 2), p. 537–546, (1989).
Stansbury, "Difunctional and Multifunctional Monomers Capable of Cyclopolymerization," Macromolecules, vol. 24 (No. 8), p. 2029–2035, (1991).
Gaylord et al., "Donor–Acceptor Complexes in Copolymerization," Journal of Polymer Science: Polymer Chemistry Edition, John Wiley & Sons, Inc., p. 203–214, (1973).

* cited by examiner

Primary Examiner—Bernard Lipman
(74) Attorney, Agent, or Firm—Haugen Law Firm PLLP

(57) ABSTRACT

The present invention provides a production process for a transparent heat-resistant resin, and further, a transparent heat-resistant resin and uses therefor, wherein the production process involves high dealcoholation conversion and a low content of residual volatiles in the resultant resin, and therefore can prevent foam or silver streak from occurring in the molded product, and further, facilitates melt-molding such as injection molding, and is fit for industrial production, and involves good efficiency. The production process for a transparent heat-resistant resin comprises the step of running a dealcoholation reaction of a polymer having a hydroxyl group and an ester group in its molecular chain to introduce a lactone ring structure into the polymer to obtain a transparent resin having the heat resistance, and is characterized in that the dealcoholation reaction is run in the presence of a solvent, and further characterized by further comprising a devolatilization step which is carried out jointly with the dealcoholation reaction.

9 Claims, No Drawings

PRODUCTION PROCESS AND USE FOR TRANSPARENT HEAT-RESISTANT RESIN

This is a divisional of U.S. patent application Ser. No. 09/453,325 filed Dec. 2, 1999, now abandonded, and claims the benefit thereof under 35 U.S.C. §120.

BACKGROUND OF THE INVENTION

A. Technical Field

The present invention relates to a production process and a use for a transparent heat-resistant resin, more particularly, to a production process and a use for a transparent heat-resistant resin, which process is characterized by involving a specific heating vacuum treatment.

B. Background Art

A methacrylic resin is excellent in transparency, surface gloss, and weather resistance and is well-balanced with regard to mechanical strength, molding processibility, and surface hardness, so the methacrylic resin is widely used for optical purposes of cars, home use electric appliances, and so on. However, the glass transition temperature (Tg) of the methacrylic resin is around 110° C. and is therefore difficult to use in fields where the heat resistance is demanded. On the other hand, light sources are often designed to be put in the vicinity of the resin to meet requests for the freedom degree of the design, the achievement of the compactness and high performance, and so on. Thus, a more excellent heat-resistant resin is desired.

Polym. Prepr., 8, 1, 576 (1967) discloses a process for obtaining a methacrylic resin having the heat resistance, in which process an alkyl 2-(hydroxymethyl)acrylate/methyl methacrylate copolymer or an α-hydroxymethylstyrene/methyl methacrylate copolymer is allowed to run a dealcoholation reaction by heating under vacuum with an extruder to form a lactone ring due to condensation of hydroxyl group and ester group of the polymer, thus obtaining the heat-resistant resin. In this process, solution polymerization or bulk polymerization is carried out. In the case of the solution polymerization, the resultant polymer is separated in the form of a solid from polymerization reaction products, and then introduced into the extruder. In the case of the bulk polymerization, the solid polymer resultant from the polymerization is granulated without modification, and then introduced into the extruder. Therefore, this process is unfit for industrial production. Furthermore, in this process, when the content of the alkyl 2-(hydroxymethyl)acrylate or α-hydroxymethylstyrene is increased, the resultant conversion of the dealcoholation reaction is low. As is seen in the case of the α-hydroxymethylstyrene/methyl methacrylate copolymer, for example, when the content of α-hydroxymethylstyrene in the polymer is 25%, the conversion of the dealcoholation reaction is 71%, and when the content of α-hydroxymethylstyrene in the polymer is 30%, the conversion is 59%. Therefore, there are demerits, for example, in that when the resultant polymer is re-shaped by heating, the dealcoholation reaction proceeds to cause the molded product to foam. Another problem is that the production process is complicated because the solid polymer is transferred, or introduced into the extruder.

JP-A-09-241323 discloses another prior art in which, if poly[ethyl 2-(hydroxymethyl)acrylate], poly[alkyl 2-(hydroxymethyl)acrylate], or a polymer having a high content of ethyl 2-(hydroxymethyl)acrylate or alkyl 2-(hydroxymethyl)acrylate is used in a solid state in its dealcoholation reaction, then the polymer is crosslinked in the reaction to make melt-molding difficult, therefore the dealcoholation is carried out in a solution state as made by: once obtaining the polymer in a solid state by reprecipitation, and then re-dissolving the resultant polymer into dimethyl sulfoxide (DMSO). However, this process needs the steps of the reprecipitation, the separation of the resultant solid, and the re-dissolution of this solid, and is therefore unfit for industrial production. In addition, also as to this process, the dealcoholation conversion is so insufficient that it is necessary to keep high temperature for a certain time in order to further advance the reaction in the molding step such as press molding, or that it is necessary to run the reaction in a solution for a long time in order to increase the dealcoholation conversion. Furthermore, this process needs a step of removing the solvent again because the resin as obtained by the dealcoholation reaction is in a solution state. In addition, even if a dealcoholation conversion near 90% can be achieved, and even if the resultant resin provides results satisfactory in some degree with regard to the heat-resistance of the resin, there is still a great demerit in that foam or silver streak occurs in the molded product due to heating in the molding step.

SUMMARY OF THE INVENTION

A. Object of the Invention

An object of the present invention is to provide a production process for a transparent heat-resistant resin, and further, a transparent heat-resistant resin and uses therefor, wherein the production process involves high dealcoholation conversion and a low content of residual volatiles in the resultant resin, and therefore can prevent foam or silver streak from occurring in the molded product, and further, facilitates melt-molding such as injection molding, and is fit for industrial production, and involves good efficiency.

B. Disclosure of the Invention

The present inventors diligently studied to solve the above problems, and as a result, found that the above problems could be all solved if a process comprising the step of running a dealcoholation reaction of a polymer having a hydroxyl group and an ester group in its molecular chain to introduce a lactone ring structure into the polymer to obtain a transparent resin having the heat resistance further comprises the step of running the dealcoholation reaction and a devolatilization treatment simultaneously with each other in the presence of a solvent.

That is to say, a production process for a transparent heat-resistant resin, according to the present invention, comprises the step of running a dealcoholation reaction of a polymer having a hydroxyl group and an ester group in its molecular chain to introduce a lactone ring structure into the polymer to obtain a transparent resin having the heat resistance, and is characterized in that the dealcoholation reaction is run in the presence of a solvent, and further characterized by further comprising a devolatilization step which is carried out jointly with the dealcoholation reaction.

In addition, a transparent heat-resistant resin, according to the present invention, is obtained by a process including the step of running a dealcoholation reaction of a polymer having a hydroxyl group and an ester group in its molecular chain to introduce a lactone ring structure into the polymer, and is characterized by having a dealcoholation conversion of not lower than 90% as determined from a weight loss between 150 and 300° C. in dynamic TG measurement. Furthermore, a transparent heat-resistant resin molding material, according to the present invention, is characterized by comprising this transparent heat-resistant resin according to the present invention. If this transparent heat-resistant resin molding material according to the present invention is molded, a molded product according to the present invention is obtained.

Another transparent heat-resistant resin, according to the present invention, is obtained by a process including the step of running a dealcoholation reaction of a polymer having a hydroxyl group and an ester group in its molecular chain to introduce a lactone ring structure into the polymer, and is characterized by having a yellowness index (YI) of not more than 6 in a 15 weight % chloroform solution. Furthermore, another transparent heat-resistant resin molding material, according to the present invention, is characterized by comprising this transparent heat-resistant resin according to the present invention. If this transparent heat-resistant resin molding material according to the present invention is molded, another molded product according to the present invention is obtained.

Yet another transparent heat-resistant resin, according to the present invention, is obtained by a process including the step of running a dealcoholation reaction of a polymer having a hydroxyl group and an ester group in its molecular chain to introduce a lactone ring structure into the polymer, and is characterized by having a weight-average molecular weight of 40,000~300,000.

Yet another transparent heat-resistant resin, according to the present invention, is obtained by a process including the step of running a dealcoholation reaction of a polymer having a hydroxyl group and an ester group in its molecular chain to introduce a lactone ring structure into the polymer, and is characterized in that a molded product by injection molding of the transparent heat-resistant resin has a total luminous transmittance of not lower than 85%.

Yet another transparent heat-resistant resin, according to the present invention, is obtained by a process including the step of running a dealcoholation reaction of a polymer having a hydroxyl group and an ester group in its molecular chain to introduce a lactone ring structure into the polymer, and is characterized in that a molded product by injection molding of the transparent heat-resistant resin has a haze value of not higher than 5%.

These and other objects and the advantages of the present invention will be more fully apparent from the following detailed disclosure.

DETAILED DESCRIPTION OF THE INVENTION (Raw Polymer):

In the production process for a transparent heat-resistant resin, according to the present invention, the resin is obtained using the polymer having a hydroxyl group and an ester group in its molecular chain as a raw material.

The polymer having a hydroxyl group and an ester group in its molecular chain is a polymer having a hydroxyl group and an ester group which are bonded to the principal chain directly or through some atoms, and this polymer is to involve condensation cyclization of at least part of the above hydroxyl group and ester group due to the dealcoholation reaction to form a lactone ring. Especially, the case where the above hydroxyl group and the above ester group are present in the vicinity of each other has the advantage of easily forming the lactone ring, and thus, it is more preferable that the number of the atoms which are present between the hydroxyl group and the ester group is not larger than 6, most preferably not larger than 4. In the case where this number is larger than 6, there are disadvantages in that crosslinking due to an intermolecular reaction occurs to facilitate gelation. The molecular weight of this polymer is not especially limited, but the weight-average molecular weight is preferably in the range of 1,000~1,000,000, particularly, more preferably 5,000~500,000, still more preferably 40,000~300,000. In the case where the molecular weight is lower than the above range, there is a problem in that the resultant product has so low mechanical strength as to be brittle. In the case where the molecular weight is higher than the above range, there is a problem in that the resultant product has so low fluidity as to be difficult to mold.

As to the content of the hydroxyl group and the ester group in the molecular chain of the transparent heat-resistant resin according to the present invention, for example, when a 2-(hydroxyalkyl)acrylate ester is a raw monomer, the content of the 2-(hydroxyalkyl)acrylate ester monomer in the polymer is preferably in the range of 5~60 weight %, more preferably 10~60 weight %, still more preferably 20~50 weight %, and particularly preferably 20~40 weight %. When the polymer is obtained from monomers having a hydroxyl group and an ester group separately or includes repeating units of such monomers, the above content is represented by the content of a monomer having a hydroxyl group or ester group, of whichever the equivalent is smaller, or by the content of a repeating unit of such a monomer. In the case where the content of the hydroxyl group and the ester group is low, the heat resistance or solvent resistance of the polymer resultant from the dealcoholation is not enhanced very much. In the case where the content of the hydroxyl group and the ester group is too high, for example, exceeds 60 weight %, the polymer might be crosslinked to make melt-molding difficult, or the dealcoholation conversion might be so low that the molded product might easily foam.

In the present invention, the above polymer is introduced into the below-mentioned step of the dealcoholation reaction and devolatilization in the presence of a solvent. The solvent, as used in this step, is not especially limited, but it is economically preferable to use the solvent without being entirely removed after being used for the polymerization reaction to obtain the polymer. For example, solvents which are used for conventional radical polymerization reactions are selected, and examples thereof include: aromatic hydrocarbons such as toluene, xylene, and ethylbenzene; ketones such as methyl ethyl ketone and methyl isobutyl ketone; and chloroform, DMSO, and tetrahydrofuran. In addition, considering that the use of a solvent having too high boiling point would result in a high content of residual volatiles in the resultant resin after devolatilization, solvents which dissolve the polymer at treatment temperature and have a boiling point of 50~200° C. are preferable. More preferable examples thereof include aromatic hydrocarbons such as toluene and ketones such as methyl ethyl ketone.

Incidentally, as is mentioned below, the aforementioned polymer, for example, can be obtained not only by a process including the step of polymerizing raw monomers, at least part of which is a monomer having a hydroxyl group and an ester group or a mixture of a monomer having a hydroxyl group and a monomer having an ester group, but also by a process including the step of post-introducing the hydroxyl group or ester group into the polymer, for example, by utilizing the following reactions: an addition reaction of a hydroxyl group to a double-bond portion of a copolymer of a diene compound such as butadiene; hydrolysis of a polymer having an ester group, such as a vinyl acetate copolymer; and esterification of a polymer having a carboxyl group or acid anhydride group.

(Monomer as Raw Material of Polymer):

The monomer, which is a raw material of the aforementioned polymer having a hydroxyl group and an ester group in its molecular chain, is not especially limited, but it is particularly preferable that at least part of the raw materials is a vinyl monomer having a hydroxyl group and an ester group in its molecule or a mixture of a vinyl monomer having a hydroxyl group in its molecule and a vinyl monomer having an ester group in its molecule. Other vinyl monomers are permitted to coexist with the above vinyl monomers.

The vinyl monomer having a hydroxyl group and an ester group in its molecule is not especially limited, but monomers of general formula (1) below are particularly preferable, of which examples include methyl 2-(hydroxymethyl)acrylate, ethyl 2-(hydroxymethyl) acrylate, isopropyl 2-(hydroxymethyl)acrylate, n-butyl 2-(hydroxymethyl)acrylate, and t-butyl 2-(hydroxymethyl) acrylate. Among them, methyl 2-(hydroxymethyl)acrylate and ethyl 2-(hydroxymethyl)acrylate are particularly preferable, and further, methyl 2-(hydroxymethyl)acrylate is most preferable because it has the highest effect to enhance the heat resistance. The above monomers may be used either alone respectively or in combinations with each other.

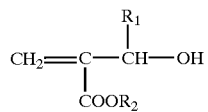

(1)

wherein $R_1$ and $R_2$ are the same as or different from each other and denote a hydrogen atom or an organic residue.

The aforementioned vinyl monomer having a hydroxyl group in its molecule is not especially limited, but examples thereof include: monomers of general formula (1) above; α-hydroxymethylstyrene; α-hydroxyethylstyrene; 2-(hydroxyalkyl) acrylate esters such as methyl 2-(hydroxyethyl)acrylate; and 2-(hydroxyalkyl)acrylic acids such as 2-(hydroxyethyl)acrylic acid. These may be used either alone respectively or in combinations with each other. Among them, the monomers of general formula (1) above are preferable, because the use thereof prevents the gelation from occurring due to a crosslinking reaction even if the dealcoholation conversion, that is, the lactonization conversion, is enhanced.

The aforementioned vinyl monomer having an ester group in its molecule is not especially limited, but examples thereof include: monomers of general formula (1) above; acrylate esters such as methyl acrylate, ethyl acrylate, n-butyl acrylate, isobutyl acrylate, t-butyl acrylate, cyclohexyl acrylate, and benzyl acrylate; and methacrylate esters such as methyl methacrylate, ethyl methacrylate, propyl methacrylate, n-butyl methacrylate, isobutyl methacrylate, t-butyl methacrylate, cyclohexyl methacrylate, and benzyl methacrylate. These may be used either alone respectively or in combinations with each other. Among them, methyl methacrylate is preferable in respect to the heat resistance and the transparency.

The other monomers, which may be jointly used with the above vinyl monomer having a hydroxyl group and an ester group in its molecule or with the above mixture of the vinyl monomer having a hydroxyl group in its molecule and the vinyl monomer having an ester group in its molecule, are not especially limited, but monomers of general formula (2) below and monomers such as N-substituted maleimides are particularly preferable, of which examples include styrene, α-methylstyrene, acrylonitrile, methyl vinyl ketone, ethylene, propylene, and vinyl acetate. Among them, styrene and α-methylstyrene are particularly preferable. In addition, the above monomers may be used either alone respectively or in combinations with each other. In addition, the content of the above monomers, which may further be used, is preferably not higher than 30 weight %, more preferably not higher than 20 weight %, still more preferably not higher than 10 weight %.

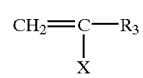

(2)

wherein:
$R_3$ denotes a hydrogen atom or a methyl group; and
X denotes a hydrogen atom, an alkyl group with 1 to 6 carbon atoms, an aryl group, an —OAc group, a —CN group, or a —$COR_0$ group, wherein $R_0$ denotes a hydrogen atom or an organic residue.

(Polymerization Reaction):

The method of the polymerization reaction to obtain the aforementioned polymer, as used in the production process according to the present invention, from the aforementioned monomers is not especially limited, but solution polymerization or bulk polymerization is preferable. Furthermore, in the present invention, because, as is mentioned below, the dealcoholation reaction needs to be run in the presence of a solvent, the solution polymerization is particularly preferable. In addition, as to the bulk polymerization, the solvent may be added after the polymerization, if necessary. Regardless of the polymerization method, if necessary, after once separating the resultant polymer in the form of a solid, the solvent may be added thereto. Furthermore, as to the bulk polymerization, the resultant reaction mixture may be in a solution state due to the presence of monomers remaining unreacted. The polymerization temperature and the polymerization time are different according to factors such as sorts and ratios of polymerizable monomers as used, but, preferably, the polymerization temperature is in the range of 0~150° C., and the polymerization time is in the range of 0.5~20 hours, and more preferably, the polymerization temperature is in the range of 80~140° C., and the polymerization time is in the range of 1~10 hours.

When the polymerization reaction is run by the solution polymerization, the solvent as used is not especially limited, but, for example, solvents which are used for conventional radical polymerization reactions are selected, and examples thereof include: aromatic hydrocarbons such as toluene, xylene, and ethylbenzene; ketones such as methyl ethyl ketone and methyl isobutyl ketone; and chloroform, DMSO, and tetrahydrofuran. In addition, considering that the use of a solvent having too high boiling point would result in a high content of residual volatiles in the resultant resin after devolatilization, solvents which dissolve the polymer at treatment temperature and have a boiling point of 50~200° C. are preferable. More preferable examples thereof include aromatic hydrocarbons such as toluene and ketones such as methyl ethyl ketone.

In the polymerization reaction, an initiator may be added, if necessary. The initiator is not especially limited, but examples thereof include: organic peroxides such as cumene hydroperoxide, diisopropylbenzene hydroperoxide, di-t-butyl peroxide, lauroyl peroxide, benzoyl peroxide, t-butyl peroxyisopropyl carbonate, and t-amyl peroxy-2-ethylhexanoate; and azo compounds such as 2,2'-azobis (isobutyronitrile), 1,1'-azobis(cyclohexan ecarbonitrile), and 2,2'-a zobis(2,4-dimethylvaleronitrile). These may be used either alone respectively or in combinations with each other. Incidentally, the amount of the initiator as used may fitly be set according to factors such as combinations of monomers as used and reaction conditions, therefore, is not especially limited.

The polymerization reaction mixture, resultant from the above polymerization reaction, contains the solvent as well as the resultant polymer. However, in the production process according to the present invention, it is not necessary to entirely remove this solvent to separate the polymer in a solid state. Therefore, preferably, the polymer is introduced into the subsequent step in a state of containing the solvent. In addition, after separating the polymer in a solid state, a solvent which is favorable for the subsequent step may be re-added thereto, if necessary. The amount of the solvent is in the range of usually 5~90 weight %, preferably 10~80 weight %, more preferably 30~75 weight %, of the entirety. In the case where the amount is smaller than 5 weight %, the polymer has so high viscosity as to be difficult to handle. In the case where the amount exceeds 90 weight %, the amount of solvent to be devolatilized is too large, therefore the productivity is low.

(Production Process for Transparent Heat-resistant Resin):

The production process for a transparent heat-resistant resin, according to the present invention, comprises the step of running a dealcoholation reaction of a polymer having a hydroxyl group and an ester group in its molecular chain to introduce a lactone ring structure into the polymer to obtain a transparent resin having the heat resistance, and is characterized in that the dealcoholation reaction is run in the presence of a solvent, and further characterized by further comprising a devolatilization step which is carried out jointly with the dealcoholation reaction.

The dealcoholation reaction in the present invention is a reaction which involves condensation cyclization of at least part of the hydroxyl group and ester group in the molecular chain of the aforementioned polymer due to heating to form a lactone ring, wherein the condensation cyclization involves formation of an alcohol as a by-product. The formation of this lactone ring structure in the molecular chain gives high heat resistance. In the case where the conversion of the above dealcoholation reaction is insufficient, there are disadvantages in that the heat resistance might not sufficiently be enhanced, or in that the dealcoholation occurs in the molding step due to the heating treatment in the molding step to result in the presence of the resultant alcohol in the form of foam or silver streak in the molded product.

On the other hand, the devolatilization step in the present invention is a treatment step in which volatiles, such as solvents and residual monomers, and the alcohol, as formed as a by-product from the above dealcoholation reaction, are removed (under vacuum heating conditions, if necessary). In the case where this treatment step is insufficient, the content of residual volatiles in the resultant resin is so large that the resin becomes colored due to factors such as deterioration in the molding step, or that there occur, for example, problems of molding defects such as foam or silver streak.

In the production process according to the present invention, it is necessary that the aforementioned dealcoholation reaction is run in the presence of a solvent, when the aforementioned devolatilization step is jointly carried out. This is one of the characteristics of the present invention. Running the dealcoholation reaction in the presence of a solvent can overcome the demerit of the low conversion as seen when running the dealcoholation reaction in a solid state. As a result, high conversion can be realized. In addition, in this process, because the alcohol as formed as a by-product in the dealcoholation reaction is removed by forcible devolatilization, the equilibrium of the reaction moves to the product side, with the result that the high conversion can be achieved in a considerably shorter time than conventional cases. Furthermore, because the dealcoholation reaction and the devolatilization step are jointly carried out, the cost down of the process can also be achieved. Particularly, it is preferable that the aforementioned step is carried out in a solution state. In addition, when the present invention is, for example, applied to the monomer having the specific structure of general formula (1), the dealcoholation conversion is enhanced, in other words, the lactone cyclization conversion is enhanced, so this is a very excellent treatment step. In addition, the heat resistance and the moldability of the resultant resin are more excellent than those of lactone-ring-containing substances as obtained by conventional known processes.

In the present invention, the dealcoholation conversion, as determined from a weight loss between 150 and 300° C. in dynamic TG measurement, is preferably not lower than 90%, more preferably not lower than 95%, still more preferably not lower than 97%, at the end of the dealcoholation reaction.

The content of residual volatiles in the transparent heat-resistant resin, as obtained by the production process according to the present invention, is preferably not higher than 1,500 ppm, more preferably not higher than 1,000 ppm. In the case where the content is higher than these ranges, molding defects are caused, such as coloring (due to factors such as deterioration in the molding step), foam, or silver streak.

When running the above dealcoholation reaction, other thermoplastic resins may be caused to coexist with the aforementioned polymer having a hydroxyl group and an ester group in its molecular chain.

When running the above dealcoholation reaction, an esterification or transesterification catalyst which is conventionally used such as p-toluenesulfonic acid may be used as a catalyst of the dealcoholation reaction, if necessary. In the production process according to the present invention, however, it is preferable to use an organophosphorus compound as the catalyst. These catalysts may be added at the beginning and/or on the way of the reaction.

If the organophosphorus compound is used as the aforementioned catalyst, not only can the dealcoholation conversion be enhanced, but also coloring of the resultant resin can greatly be reduced. Moreover, the use of such a catalyst can prevent the molecular weight of the resultant resin from lowering in the devolatilization step, and further, can give excellent mechanical strength.

Examples of the organophosphorus compound, usable as a catalyst when carrying out the dealcoholation reaction, include:

alkyl(aryl)phosphonous acids (which may be their tautomers, namely, alkyl(aryl)phosphinic acids) such as methylphosphonous acid, ethylphosphonous acid, and phenylphosphonous acid, and their diesters or monoesters;

dialkyl(aryl)phosphinic acids such as dimethylphosphinic acid, diethylphosphinic acid, diphenylphosphinic acid, phenylmethylphosphinic acid, and phenylethylphosphinic acid, and their esters;

alkyl(aryl)phosphonic acids such as methylphosphonic acid, ethylphosphonic acid, trifluoromethylphosphonic acid, and phenylphosphonic acid, and their diesters or monoesters;

alkyl(aryl)phosphinous acids such as methylphosphinous acid, ethylphosphinous acid, and phenylphosphinous acid, and their esters;

phosphite diesters or monoesters or triesters, such as methyl phosphite, ethyl phosphite, phenyl phosphite, dimethyl phosphite, diethyl phosphite, diphenyl phosphite, trimethyl phosphite, triethyl phosphite, and triphenyl phosphite;

phosphate diesters or monoesters or triesters, such as methyl phosphate, ethyl phosphate, 2-ethylhexyl phosphate, phenyl phosphate, dimethyl phosphate, diethyl phosphate, di-2-ethylhexyl phosphate, diphenyl phosphate, trimethyl phosphate, triethyl phosphate, and triphenyl phosphate;

mono-, di-, or trialkyl(aryl)phosphines such as methylphosphine, ethylphosphine, phenylphosphine, dimethylphosphine, diethylphosphine, diphenylphosphine, trimethylphosphine, triethylphosphine, and triphenylphosphine;

alkyl(aryl)halogenphosphines such as methyldichlorophosphine, ethyldichlorophosphine, phenyldichlorophosphine, dimethylchlorophosphine, diethylchlorophosphine, and diphenylchlorophosphine;

mono-, di-, or trialkyl(aryl)phosphine oxides such as methylphosphine oxide, ethylphosphine oxide, phenylphosphine oxide, dimethylphosphine oxide, diethylphosphine oxide, diphenylphosphine oxide, trimethylphosphine oxide, triethylphosphine oxide, and triphenylphosphine oxide;

tetraalkyl(aryl)phosphonium halides such as tetramethylphosphonium chloride, tetraethylphosphonium chloride, and tetraphenylphosphonium chloride.

Among them, the alkyl(aryl)phosphonous acids, the phosphite diesters or monoesters, the phosphate diesters or monoesters, and the alkyl(aryl)phosphonic acids are particularly preferable, and further, the alkyl(aryl)phosphonous acids, the phosphite diesters or monoesters, and the phosphate diesters or monoesters are more preferable in respect to high catalytic activity and low coloring property. Among them, the alkyl(aryl)phosphonous acids and the phosphate diesters or monoesters are particularly preferable. The organophosphorus compounds may be used either alone respectively or in combinations with each other.

The amount of the catalyst, usable for the dealcoholation reaction, is not especially limited, but is preferably in the range of 0.001~10 weight %, more preferably 0.01~5 weight %, still more preferably 0.01~2.5 weight %, yet still more preferably 0.05~1 weight %, of the raw polymer. In the case where the amount of the catalyst as used is smaller than 0.001 weight %, there are disadvantages in that the dealcoholation conversion could not sufficiently be enhanced. On the other hand, in the case where the amount of the catalyst as used is larger than 10 weight %, there are disadvantages in that the catalyst causes coloring, or the polymer is crosslinked to make melt-molding difficult. Incidentally, the timing to add the catalyst is not especially limited, and for example, the catalyst may be added at the beginning and/or on the way of the reaction.

In the production process according to the present invention, it is necessary that the aforementioned dealcoholation reaction is run in the presence of a solvent, when the aforementioned devolatilization step is jointly carried out. Examples of embodiments thereof include an embodiment in which the devolatilization step is jointly carried out throughout the dealcoholation reaction, and further, an embodiment in which the devolatilization step is jointly carried out not throughout the dealcoholation reaction, but only for part of the duration of the dealcoholation reaction.

As to the embodiment in which the devolatilization step is jointly carried out throughout the dealcoholation reaction, the device as used therefor is not especially limited, but, for carrying out the present invention more effectively, it is preferable to use a devolatilizer comprising a heat exchanger and a devolatilization vessel, or an extruder with vents, or a device comprising the above devolatilizer and the above extruder which are arranged tandem. Furthermore, it is more preferable to use either the devolatilizer comprising a heat exchanger and a devolatilization vessel, or the extruder with vents.

When the above devolatilizer comprising a heat exchanger and a devolatilization vessel is used, the reaction and treatment temperature is preferably in the range of 150~350° C., more preferably 200~300° C. In the case where the above temperature is lower than 150° C., there are unfavorable problems in that the dealcoholation reaction is insufficient, or in that the residual volatile content is high. In the case where the temperature is higher than 350° C., there are unfavorable problems in that coloring or decomposition occurs. The pressure in the reaction and treatment is preferably in the range of 931~1.33 hPa (700~1 mmHg), more preferably 798~66.5 hPa (600~50 mmHg). In the case where the above pressure is higher than 931 hPa, there are unfavorable problems in that the volatiles including the alcohol tend to remain. In the case where the pressure is lower than 1.33 hPa, there are unfavorable problems in that it becomes difficult to industrially carry out the present invention.

In addition, when the aforementioned extruder with vents is used, the number of the vents may be either one or more, but it is preferable that the extruder has more than one vent. The reaction and treatment temperature in the extruder with vents is preferably in the range of 150~350° C., more preferably 200~300° C. In the case where the above temperature is lower than 150° C., there are unfavorable problems in that the dealcoholation reaction is insufficient, or in that the residual volatile content is high. In the case where the temperature is higher than 350° C., there are unfavorable problems in that coloring or decomposition occurs. The pressure in the reaction and treatment is preferably in the range of 931~1.33 hPa (700~1 mmHg), more preferably 798~13.3 hPa (600~10 mmHg). In the case where the above pressure is higher than 931 hPa, there are unfavorable problems in that the volatiles including the alcohol tend to remain. In the case where the pressure is lower than 1.33 hPa, there are unfavorable problems in that it becomes difficult to industrially carry out the present invention.

Incidentally, as is mentioned below, as to the embodiment in which the devolatilization step is jointly carried out throughout the dealcoholation reaction, there is a possibility that the properties of the resultant resin might be deteriorated under severe heating treatment conditions. Therefore, for example, it is preferable that the aforementioned catalyst of the dealcoholation reaction is used to run the reaction under as mild conditions as possible, for example, utilizing the extruder with vents.

In the aforementioned embodiment in which the devolatilization step is jointly carried out throughout the dealcoholation reaction, the polymer having a hydroxyl group and an ester group in its molecular chain resultant from the aforementioned polymerization reaction is introduced into the above reactor system along with the solvent. In this case, the polymer may be caused to pass through the above reactor system such as extruder with vents once more, if necessary.

As to another embodiment of the production process according to the present invention, there is the embodiment in which the devolatilization step is jointly carried out not throughout the dealcoholation reaction, but only for part of the duration of the dealcoholation reaction. Examples thereof include an embodiment in which the dealcoholation reaction is allowed to preliminarily run in some degree by further heating a device which has been used to produce the polymer having a hydroxyl group and an ester group in its molecular chain, and further, if necessary, by partly jointly carrying out the devolatilization step, and thereafter, the aforementioned dealcoholation reaction in which the devolatilization step is carried out jointly and simultaneously therewith is run to complete the reaction.

As to the aforementioned embodiment in which the devolatilization step is jointly carried out throughout the dealcoholation reaction, for example, the alkyl 2-(hydroxymethyl)acrylate copolymer, which is a raw polymer to form the transparent heat-resistant resin according to the present invention, is heated at high temperature near 250° C. or at higher temperature with a twin-screw extruder, when partial decomposition for example might occur before the dealcoholation reaction according to differences of thermal hysteresis, with the result that the properties of the resultant resin might be deteriorated. Thus, the above embodiment, in which the dealcoholation reaction is allowed to preliminarily run in some degree before the dealcoholation reaction in which the devolatilization step is carried out jointly and simultaneously therewith is run, is a preferable embodiment because the reaction conditions in the latter half can be made so mild that the deterioration of the properties can be prevented. Examples of particularly preferable embodiments include an embodiment in which the devolatilization step is initiated at an interval after the dealcoholation reaction has been initiated, namely, an embodiment in which the dealcoholation reaction of at least part of the hydroxyl group and ester group in the molecular chain of the polymer resultant from the polymerization reaction is preliminarily run to increase the dealcoholation conversion in some degree, and thereafter the dealcoholation reaction in which the devolatilization step is carried out jointly and simultaneously therewith is run. Specifically, for example, an embodiment is preferable in which the dealcoholation reaction is allowed to preliminarily run to some degree of conversion in the presence of a solvent with a vessel type reactor, and thereafter the dealcoholation reaction is completed with a device, for example, a reactor having a devolatilizer such as a devolatilizer comprising a heat exchanger and a devolatilization vessel, or an extruder with vents. Especially, in this case, it is more preferable that the catalyst for the dealcoholation reaction is present.

The above process, in which the dealcoholation reaction of at least part of the hydroxyl group and ester group in the molecular chain of the polymer resultant from the polymerization reaction is preliminarily run to increase the dealcoholation conversion in some degree, and thereafter the dealcoholation reaction in which the devolatilization step is carried out jointly and simultaneously therewith is run, is a preferable embodiment for obtaining the transparent heat-resistant resin according to the present invention. This embodiment can give the transparent heat-resistant resin, according to the present invention, which has higher glass transition temperature, higher dealcoholation conversion, and excellent heat resistance. In this case, the dealcoholation reaction in the above reactor is run until the conversion reaches preferably 60%, more preferably 70%, still more preferably 80%, yet still more preferably 85%.

The reactor, usable for the aforementioned dealcoholation reaction as preliminarily run prior to the dealcoholation reaction in which the devolatilization step is carried out jointly and simultaneously therewith, is not especially limited, but preferable examples thereof include an autoclave, a vessel type reactor, and a devolatilizer comprising a heat exchanger and a devolatilization vessel. Furthermore, the extruder with vents, which is favorable for the later dealcoholation reaction in which the devolatilization step is carried out jointly and simultaneously therewith, is also usable. The autoclave and the vessel type reactor are more preferable. However, even when the reactor such as extruder with vents is used, if the vent conditions are made mild, or if no ventilation is made, or if factors such as temperature conditions, barrel conditions, shape of screw, operational conditions of screw are adjusted, then it might be possible to run the dealcoholation reaction in the same state as a reaction state in the above vessel type reactor, with the result that the transparent heat-resistant resin according to the present invention could be obtained.

Preferable examples of processes for the aforementioned dealcoholation reaction, as preliminarily run prior to the dealcoholation reaction in which the devolatilization step is carried out jointly and simultaneously therewith, include (i) a process in which a catalyst is added to a polymerization solution of the polymer, resultant from the polymerization reaction, to run a reaction of the polymerization solution by heating; (ii) a process in which a reaction of the polymerization solution is run by heating without catalyst; and a process in which the above process (i) or (ii) is carried out under pressure.

Incidentally, the "polymerization solution of the polymer" which is introduced into the dealcoholation reaction means that when the polymer as used is a product as obtained in the presence of a solvent, the polymer may intactly be used for the dealcoholation reaction, or the solvent may be once removed from the polymer, and then a solvent which is fit for the dealcoholation reaction may be added to the polymer again, and further that when the polymer as used is a product as obtained without solvent, a solvent which is fit for the dealcoholation reaction is added to the polymer, and then the resultant mixture is used.

The solvent, usable for the aforementioned dealcoholation reaction as preliminarily run prior to the dealcoholation reaction in which the devolatilization step is carried out jointly and simultaneously therewith, is not especially limited, but examples thereof include: aromatic hydrocarbons such as toluene, xylene, and ethylbenzene; ketones such as methyl ethyl ketone and methyl isobutyl ketone; and chloroform, DMSO, and tetrahydrofuran. In addition, considering that the use of a solvent having too high boiling point would result in a high content of residual volatiles in the resultant resin after devolatilization, solvents which dissolve the polymer at treatment temperature and have a boiling point of 50~200° C. are preferable. More preferable examples thereof include aromatic hydrocarbons such as toluene and ketones such as methyl ethyl ketone.

As to the catalyst as added in the above process (i), the esterification or transesterification catalyst which is conventionally used such as p-toluenesulfonic acid may be used, but, in the present invention, the use of the aforementioned organophosphorus compound is preferable. As to the timing to add the catalyst, the catalyst may be added at the beginning and/or on the way of the reaction. The amount of the catalyst as added is not especially limited, but is preferably in the range of 0.001~10 weight %, more preferably 0.01~5 weight %, still more preferably 0.01~2.5 weight %, yet still more preferably 0.05~1 weight %, of the polymer. Neither the heating temperature nor the heating period of time in the process (i) is especially limited, but the heating temperature is preferably not lower than room temperature, more preferably not lower than 50° C., and the heating period of time is preferably in the range of 1~20 hours, more preferably 2~10 hours. In the case where the heating temperature is low or where the heating period of time is short, there are disadvantages in that the dealcoholation conversion is low. In addition, in the case where the heating period of time is too long, there are disadvantages in that the resin might become colored or decompose.

Examples of the process (ii) include a process comprising the step of heating the polymerization solution intactly with a device such as an autoclave. The heating temperature is preferably not lower than 100° C., more preferably not lower than 150° C., and further, the heating period of time is preferably in the range of 1~20 hours, more preferably 2~10 hours. In the case where the heating temperature is low or where the heating period of time is short, there are disadvantages in that the dealcoholation conversion is low. In addition, in the case where the heating period of time is too long, there are disadvantages in that the resin might become colored or decompose.

Incidentally, as to both processes (i) and (ii), there is no problem even if they are carried out under pressure according to conditions.

In addition, there is no problem even if part of the solvent naturally volatilizes when the aforementioned dealcoholation reaction is preliminarily run prior to the dealcoholation reaction in which the devolatilization step is carried out jointly and simultaneously therewith.

In addition, the dealcoholation conversion, as determined from a weight loss between 150 and 300° C. in dynamic TG measurement, is preferably not lower than 60%, more preferably not lower than 80%, still more preferably not lower than 85%, at the end of the aforementioned dealcoholation reaction as preliminarily run prior to the dealcoholation reaction in which the devolatilization step is carried out jointly and simultaneously therewith, in other words, just before the aforementioned devolatilization step is initiated. In the case where this conversion is lower than 60%, there are disadvantages in that even if the dealcoholation reaction in which the devolatilization step is carried out jointly and simultaneously therewith is run subsequently, the dealcoholation conversion does not rise to a sufficiently high level, and as a result, the transparent heat-resistant resin according to the present invention cannot be obtained.

Incidentally, when running the above dealcoholation reaction, other thermoplastic resins may be caused to coexist with the aforementioned polymer having a hydroxyl group and an ester group in its molecular chain.

As to the aforementioned embodiment in which the dealcoholation reaction of at least part of the hydroxyl group and ester group in the molecular chain of the polymer resultant from the polymerization reaction is preliminarily run to increase the dealcoholation conversion in some degree, and thereafter the dealcoholation reaction in which the devolatilization step is carried out jointly and simultaneously therewith is run, a polymer as obtained from the preliminary performed dealcoholation reaction (polymer as obtained from the dealcoholation reaction of at least part of the hydroxyl group and ester group in the molecular chain) and the solvent may intactly be introduced into the dealcoholation reaction in which the devolatilization step is carried out jointly and simultaneously therewith, or the polymer and the solvent may be introduced into this dealcoholation reaction after if necessary carrying out other treatments, for example, in which the polymer is isolated and then thereto the solvent is added again.

In addition, as to the production process according to the present invention, the devolatilization step does not need to be finished at the same time as the end of the dealcoholation reaction, but may be finished at an interval after the end of the dealcoholation reaction.

(Transparent Heat-resistant Resin):

The transparent heat-resistant resin, according to the present invention, is obtained by a process including the step of running a dealcoholation reaction of a polymer having a hydroxyl group and an ester group in its molecular chain to introduce a lactone ring structure into the polymer, and is characterized by having a dealcoholation conversion of not lower than 90% as determined from a weight loss between 150 and 300° C. in dynamic TG measurement, and is a resin which can easily be produced by the above production process according to the present invention. As is mentioned above, the transparent heat-resistant resin according to the present invention has a very high dealcoholation conversion of not lower than 90%, wherein the dealcoholation conversion is preferably not lower than 95%, more preferably not lower than 97%. Therefore, this resin is free from the conventional demerit of foam or silver streak of the molded product resultant from the molding step. Furthermore, this resin has sufficiently high heat resistance due to the very high dealcoholation conversion, and further has excellent transparency.

The transparent heat-resistant resin, according to the present invention, has a yellowness index (YI) of not more than 6 in a 15 weight % chloroform solution, wherein the yellowness index (YI) is preferably not more than 4, more preferably not more than 3, most preferably not more than 2. In the production process for the transparent heat-resistant resin, according to the present invention, if as is aforementioned the organophosphorus compound is used as a catalyst for the dealcoholation reaction, then the yellowness index (YI) of the resultant resin can be suppressed to not more than 6. Transparent heat-resistant resins having a yellowness index (YI) of more than 6 would be damaged in transparency due to coloring and therefore could not be used for inherent purposes.

The transparent heat-resistant resin, according to the present invention, has a weight-average molecular weight of preferably 40,000~300,000, more preferably 80,000~200,000, most preferably 100,000~200,000. If the transparent heat-resistant resin according to the present invention is produced using the organophosphorus compound as a catalyst for the dealcoholation reaction, the molecular weight can effectively be prevented from lowering in the devolatilization step, so that the weight-average molecular weight of the resin can be retained in the above range. In the case where the weight-average molecular weight of the resin is lower than 40,000, there is a problem in that a molded product from the resin has so low mechanical strength as to tend to be brittle. On the other hand, in the case where the weight-average molecular weight of the resin is higher than 300,000, there is a problem in that the resin has so low fluidity as to be difficult to mold.

The transparent heat-resistant resin according to the present invention comprises a polymer having a lactone ring structure. The content of the lactone ring structure in this polymer is preferably not lower than 5 weight %, more preferably not lower than 10 weight %, still more preferably not lower than 15 weight %. The content of the lactone ring structure is determined by the dealcoholation conversion. As is aforementioned, in the present invention, the dealcoholation conversion of not lower than 90% can be realized, therefore a resin having a lactone ring structure which satisfies the above range can easily be obtained. In the case where the content of the lactone ring structure is lower than 5 weight %, it tends to be impossible to give sufficient heat resistance to the resultant transparent heat-resistant resin. Incidentally, specifically, the content of the lactone ring structure can be calculated by the method as described below in the "DETAILED DESCRIPTION OF THE PREFERRED EMBODIMENTS" portion hereof.

The transparent heat-resistant resin according to the present invention has a 5% weight loss temperature of preferably not lower than 330° C., more preferably not lower than 350° C., most preferably not lower than 360° C., in the thermogravimetric analysis (TG). This 5% weight loss temperature is an index of the heat resistance, and, in the case where this is lower than 330° C., sufficient thermal stability cannot be exhibited. As is aforementioned, in the present invention, the dealcoholation conversion of not lower than 90% can be realized, therefore a resin which satisfies the above range can easily be obtained.

The transparent heat-resistant resin according to the present invention has a glass transition temperature (Tg) of preferably not lower than 115° C., more preferably not lower than 120° C., still more preferably not lower than 125° C., most preferably not lower than 130° C.

The content of residual volatiles in the transparent heat-resistant resin according to the present invention is preferably not higher than 1,500 ppm, more preferably not higher than 1,000 ppm, in total. In the case where the content is higher than these ranges, molding defects are caused, such as coloring (due to factors such as deterioration in the molding step), foam, or silver streak.

As to the transparent heat-resistant resin according to the present invention, a molded product by injection molding thereof has a total luminous transmittance of preferably not lower than 85%, more preferably not lower than 88%, most preferably not lower than 90%, as measured by a method according to ASTM-D-1003. The total luminous transmittance is an index of the transparency, and, in the case where this is lower than 85%, the transparency is so low that the resin cannot be used for inherent purposes.

As to the transparent heat-resistant resin according to the present invention, a molded product by injection molding thereof has a haze value of preferably not higher than 5%, more preferably not higher than 3%, still more preferably not higher than 2%, as measured by a method according to ASTM-D-1003. The haze value is an index of the transparency, and, in the case where this is higher than 5%, the transparency is so low that the resin cannot be used for inherent purposes. Incidentally, also as to the below-mentioned transparent heat-resistant resin composition, similarly, this haze value is preferably not higher than 5%.

In addition, as to the transparent heat-resistant resin according to the present invention, a molded product by injection molding thereof has an impact strength (Izod value) of preferably not lower than 49 N·cm/cm$^2$ (5 kgf·cm/cm$^2$), more preferably not lower than 98 N·cm/cm$^2$ (10 kgf·cm/cm$^2$), still more preferably not lower than 147 N·cm/cm$^2$ (15 kgf·cm/cm$^2$), most preferably not lower than 167 N·cm/cm$^2$ (17 kgf·cm/cm$^2$), as measured by a method according to ASTM-D-256 except that an unnotched test piece is used.

Thus, the transparent heat-resistant resin according to the present invention is a novel resin which has high heat resistance, and further has good transparency with little coloring, and can prevent foam or silver streak from occurring in the molded product, and thus overcomes the demerits of conventional transparent heat-resistant resins.

In addition, unless the performance or effect is damaged, the resin may further comprise another polymer having no lactone ring structure. However, even in such a case, the content of the lactone ring structure in the transparent heat-resistant resin is preferably not lower than 5 weight %, more preferably not lower than 10 weight %, still more preferably not lower than 15 weight %.

Accordingly, the transparent heat-resistant resin according to the present invention is a novel resin which (a) has high heat resistance, (b) further has excellent transparency, (c) can prevent foam or silver streak from occurring in the molded product, and thus overcomes the demerits of conventional transparent heat-resistant resins.

The above transparent heat-resistant resins according to the present invention have excellent properties as above, and therefore may be mixed with additives, for example, antioxidants or stabilizers, reinforcements (e.g. glass fibers), ultraviolet absorbing agents, flame retardants, antistatic agents, colorants, to prepare transparent heat-resistant resin molding materials, if necessary. Furthermore, these transparent heat-resistant resin molding materials may be molded to obtain molded products. These transparent heat-resistant resin molding materials or molded products have excellent properties because they comprise the transparent heat-resistant resins according to the present invention.

(Thermoplastic Resin Composition):

Vinyl chloride resins (poly(vinyl chloride)) and acrylonitrile-styrene resins usually have glass transition temperature (Tg) in the range of about 70 to about 100° C. and are therefore difficult to use in fields where the heat resistance is demanded. As a result of diligent study to solve the aforementioned problems, the present inventors found that either the transparent heat-resistant resin, as obtained by the production process according to the present invention, or the transparent heat-resistant resin according to the present invention has excellent miscibility with other thermoplastic resins, and further, can enhance the heat resistance of those other thermoplastic resins without damaging their properties such as transparency, mechanical strength, and molding processibility.

That is to say, if either the transparent heat-resistant resin, as obtained by the production process according to the present invention, or the transparent heat-resistant resin according to the present invention (hereinafter referred to as polymer (A)) is mixed with a thermoplastic resin (B) other than the polymer (A) as thermoplastic resins, then a thermoplastic resin composition to solve the aforementioned problems is obtained. For example, if a resin having the desired properties such as transparency and mechanical strength is selected as the thermoplastic resin (B) and mixed with the polymer (A), then the heat resistance can be given to the thermoplastic resin (B) while retaining its properties.

The thermoplastic resin (B) is not especially limited if it is a thermoplastic resin other than the polymer (A), and such as has the desired properties can fitly be selected. Examples of the thermoplastic resin (B) include: olefin resins such as polyethylene, polypropylene, ethylene-propylene copolymers, and poly(4-methyl-pentene-1); halogen-containing polymers such as vinyl chloride resins and chlorinated vinyl resins; acrylic polymers such as poly(methyl methacrylate); styrenic polymers such as polystyrene, styrene-methyl methacrylate copolymers, acrylonitrile-styrene copolymers, and acrylonitrile-butadiene-styrene block copolymers; polyesters or polyarylates such as poly(ethylene terephthalate) and poly(butylene terephthalate); polyamides such as nylon 6, nylon 66, and nylon 610; polyacetals; polycarbonates; polyphenylene oxide; polyphenylene sulfide; polysulfones; polyether sulfones; polyether ether ketones; polyoxybenzylene; polyamideimides. These may be used either alone respectively or in combinations with each other.

When the transparency is given to the aimed thermoplastic resin composition, the thermoplastic resin (B) can be used without especial limitation if it is miscible with the polymer (A) and transparent. In addition, if the thermoplastic resin (B) is a thermoplastic resin having a refractive index that is the same as of the polymer (A) or approximate thereto even if the thermoplastic resin (B) has low miscibility, then such a thermoplastic resin has little influence upon the transparency, and can be used similarly favorably. From such a viewpoint, acrylic polymers (such as poly(methyl methacrylate)), polystyrene, polycarbonates, styrene-methyl methacrylate copolymers, vinyl chloride resins, and acrylonitrile-styrene resins are particularly preferable among the above-exemplified thermoplastic resins (B) in respect to excellent transparency, and further, vinyl chloride resins and acrylonitrile-styrene resins are particularly preferable among the above-exemplified thermoplastic resins (B) in respect to excellent miscibility.

In addition, rubber polymers may be used as the aforementioned thermoplastic resin (B). Examples of the rubber polymer include: polybutadiene-rubber-containing ABS resins, acrylic-rubber-containing ASA resins, polyolefinic-rubber-containing AES resins or HIPS; thermoplastic elastomers such as polyolefins and polyesters, or elastomers such as SBS and SIS. These rubber polymers may be used either alone respectively or in combinations with each other, and of course, can be used jointly with the previously exemplified thermoplastic resins.

In addition, when the impact resistance is particularly desired for the aimed thermoplastic resin composition, it is preferable to use rubber-component-containing thermoplastic resins, for example, ABS resins, ASA resins, AES resins, or vinyl chloride resins that contain MBS resins, as the thermoplastic resin (B). If these are used as the thermoplastic resin (B), a resin composition having both excellent mechanical strength and high heat resistance is obtained.

When the aforementioned resin having the transparency is used as the thermoplastic resin (B), the miscibility of the polymer (A) with the thermoplastic resin (B) is so excellent that the haze value, as measured by a method in accordance with ASTM-D-1003 using a molded test piece of the resultant thermoplastic resin composition, retains a low value of not higher than 5%, and that therefore high transparency can be exhibited. Specifically, for example, when the vinyl chloride resin and/or the acrylonitrile-styrene resin is used as the thermoplastic resin (B), a molded test piece of the resultant thermoplastic resin composition has a haze value of not higher than 5%. The haze value, which is an index of the transparency, is more preferably not higher than 4%, particularly preferably not higher than 2%.

The weight ratio of the polymer (A) to the thermoplastic resin (B) in the composition is preferably in the range of polymer (A)/thermoplastic resin (B)=1/99~99/1, more preferably 10/90~90/10. Particularly, when it is desired to enhance the heat resistance as well as to make the thermoplastic resin (B) exhibit its properties at the maximum, the weight ratio is preferably in the range of polymer (A)/thermoplastic resin (B)=10/90~80/20, more preferably 10/90~70/30, particularly preferably 10/90~60/40.

The thermoplastic resin composition may be either a mixture consisting of the polymer (A) and the thermoplastic resin (B), or such a mixture which further contains various additives if necessary. Specific examples of the various additives include antioxidants or stabilizers, such as hindered phenols, phosphorus-containing substances, and sulfur-containing substances; reinforcements such as glass fibers and carbon fibers; ultraviolet absorbing agents such as phenyl salicylate, 2-(2'-hydroxy-5-methylphenyl)benzotriazole, and 2-hydroxybenzophenone; flame retardants such as tris(dibromopropyl) phosphate, triphenyl phosphate, triallyl phosphate, ethylene tetrabromide, antimony oxide, and zinc borate; antistatic agents such as anionic surfactants, cationic surfactants, nonionic surfactants, and amphoteric surfactants; colorants such as inorganic pigments, organic pigments, and dyes; and fillers or other resin reforming agents; but there is no especial limitation thereto. The content of these additives is not especially limited unless it damages the properties of the resultant thermoplastic resin composition. However, specifically, the total content of the polymer (A) and the thermoplastic resin (B) in the resultant thermoplastic resin composition is preferably not lower than 1 weight %, more preferably not lower than 5 weight %, still more preferably not lower than 10 weight %, most preferably not lower than 20 weight %.

(Transparent Heat-resistant Resin Molding Material):

The transparent heat-resistant resin according to the present invention may be mixed with additives to prepare a transparent heat-resistant resin molding material, if necessary. Examples of the additive include: antioxidants or stabilizers, such as hindered phenols, phosphorus-containing substances, and sulfur-containing substances; reinforcements such as glass fibers and carbon fibers; ultraviolet absorbing agents such as phenyl salicylate, 2-(2'-hydroxy-5-methylphenyl)benzotriazole, and 2-hydroxybenzophenone; flame retardants such as tris(dibromopropyl) phosphate, triphenyl phosphate, triallyl phosphate, ethylene tetrabromide, antimony oxide, and zinc borate; antistatic agents such as anionic surfactants, cationic surfactants, nonionic surfactants, and amphoteric surfactants; and colorants such as inorganic pigments, organic pigments, and dyes. The transparent heat-resistant resin according to the present invention, as used for this transparent heat-resistant resin molding material, is preferably a transparent heat-resistant resin which is obtained by a process including the step of running a dealcoholation reaction of a polymer having a hydroxyl group and an ester group in its molecular chain to introduce a lactone ring structure into the polymer and is characterized by having a dealcoholation conversion of not lower than 90% as determined from a weight loss between 150 and 300° C. in dynamic TG measurement, or by having a yellowness index (YI) of not more than 6 in a 15 weight % chloroform solution. The molding material comprising the transparent heat-resistant resin according to the present invention is the transparent heat-resistant resin molding material according to the present invention. The content of the transparent heat-resistant resin according to the present invention in the transparent heat-resistant resin molding material is preferably in the range of 10~100 weight %, more preferably 30~100 weight %, most preferably 50~100 weight %.

(Molded Product):

The molded product according to the present invention is obtained by molding the aforementioned transparent heat-resistant resin molding material comprising the transparent heat-resistant resin according to the present invention, and is a product as molded in the range of preferably 150~350° C., more preferably in 200~300° C., but the molding temperature may be set fitly according to the properties of the resin such as heat resistance, and is not especially limited. The molding method is not especially limited, and examples thereof include injection molding, blow molding, and extrusion molding.

The transparent heat-resistant resin according to the present invention has excellent transparency, and therefore, for example, can be applied to transparent optical lenses, optical elements (e.g. light-leading materials available for lighting of various gauges, displays or signboards; plastic optical fibers; light-diffusible molded products of the shape, for example, of films, sheets, bowls, or polyhedrons), and transparent parts for purposes such as OA instruments or cars (e.g. lenses for lazer beam printers; lamp lenses for head lamps or fog lamps of cars or for signal lamps), and further, is favorable in respect to easy moldability into various shapes. Moreover, the resin or composition thereof according to the present invention is, for example, further applicable to: molded products of the shape of film or sheet; laminate sheets with other resins; surface layer resins for bathtubs.

Because the molded product according to the present invention is obtained from the transparent heat-resistant resin molding material comprising the transparent heat-resistant resin according to the present invention, this molded product is very useful in respect to being able to entirely or almost entirely avoid foam or silver streak which are unavoidable in cases of conventional transparent heat-resistant resin molded products.

Incidentally, the aforementioned thermoplastic resin composition is also favorably usable as a molding material for the aforementioned molded product.

(Effects and Advantages of the Invention):

The present invention can provide a production process for a transparent heat-resistant resin, and further, a transparent heat-resistant resin and uses therefor, wherein the production process involves high dealcoholation conversion and a low content of residual volatiles in the resultant resin, and therefore can prevent foam or silver streak from occurring in the molded product, and further, facilitates melt-molding such as injection molding, and is fit for industrial production, and involves good efficiency.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to these examples. Incidentally, hereinafter, the unit "part(s)" is by weight.

(Analyses of Polymerization Conversion and Composition of Polymer):

The conversion in the polymerization reaction and the content of a specific monomer unit in the polymer were determined by measuring the amount of unreacted monomer in the resultant polymerization reaction mixture by gas chromatography (device name: GC-14A, made by Shimadzu Corporation).

(Dealcoholation Conversion and Lactone Ring Structure Content):

The polymer (or polymer solution or pellets) resultant from the dealcoholation reaction was once dissolved into tetrahydrofuran or diluted therewith, and then added into an excess of hexane or methanol to carry out reprecipitation. The separated precipitate was dried under vacuum (at 1 mmHg (1.33 hPa), 80° C. for not shorter than 3 hours) to remove fractions such as volatiles. Then, the dealcoholation conversion of the resultant white solid resin was analyzed by the following method (dynamic TG method).

Measurement device: Thermo Plus2 TG-8120 Dynamic TG (made by Rigaku Co., Ltd.)
Measurement conditions:
amount of sample=about 5 mg
temperature elevation rate=10° C./min
atmosphere=nitrogen flow of 200 ml/min
method=stepwise isothermal analysis (SIA method) (controlled at weight loss rate of not higher than 0.005%/sec between 60 and 500° C.)

Conversion: as determined from a weight loss on the dealcoholation reaction in the elevating temperature range of from 150° C. before the beginning of the weight loss to 300° C. before the beginning of the decomposition of the polymer in this measurement on the basis of a weight loss to occur when all hydroxyl groups in the composition of the polymer resultant from Referential Examples 1 to 3 below are dealcoholated in the form of methanol.

That is to say, in the thermal analysis (dynamic TG) of the polymer having a lactone ring structure, the weight loss of from 150 to 300° C. was measured to regard the resultant found weight loss as (X). On the other hand, the theoretical weight loss is calculated as (Y) from the composition of the polymer on the assumption that all hydroxyl groups in the composition of the polymer are dealcoholated by being converted into an alcohol to join the formation of the lactone ring (in other words, the theoretical weight loss is a weight loss as calculated on the assumption that the dealcoholation reaction occurred in the ratio of 100% in the composition). Incidentally, more specifically, the theoretical weight loss (Y) can be calculated from the molar ratio of a raw monomer, having a structure (hydroxyl group) to join the dealcoholation reaction, in the polymer, and from the content of this raw monomer in the composition of the polymer. If these values (X, Y) are substituted for the following dealcoholation calculation formula:

$$1-(\text{found weight loss (X)/theoretical weight loss (Y)})$$

and if the resultant value is represented with %, then the dealcoholation conversion is obtained. Furthermore, the content of the lactone ring structure in the polymer can be calculated by considering the expected lactonization to have been made corresponding to the resultant dealcoholation conversion, and by multiplying the content (weight ratio) of the raw monomer, having a structure (hydroxyl group) to join the lactonization, in the composition of the polymer by the above dealcoholation conversion.

For example, the content of the lactone ring structure in the polymer resultant from Example 1 below is calculated as follows. If the theoretical weight loss (Y) of this polymer is determined from molecular weight of methanol=32, molecular weight of methyl 2-(hydroxymethyl)acrylate=116, and content (weight ratio) of methyl 2-(hydroxymethyl)acrylate in polymer=20.0% in composition, then $(32/116) \times 20.0 \approx 5.52$ weight % is given. On the other hand, the weight loss (X) as found by the dynamic TG measurement was 0.23 weight %. If these values are substituted for the above dealcoholation calculation formula, then $1-(0.23/5.52) \approx 0.958$ is given, so the dealcoholation conversion is 95.8%. Furthermore, if the expected lactonization is considered to have been made corresponding to the resultant dealcoholation conversion in the polymer, and if the content of methyl 2-(hydroxymethyl) acrylate in the polymer (20.0%) is multiplied by the above dealcoholation conversion (95.8%=0.958), then the content of the lactone ring structure in the polymer is given as $19.2(=20.0 \times 0.958)$ weight %.

Incidentally, the dealcoholation conversion as above is an important index to regulate the reaction state of the polymer when the dealcoholation reaction is preliminarily run prior to the dealcoholation reaction in which the devolatilization step is carried out jointly and simultaneously therewith.

(Weight-average Molecular Weight):

The weight-average molecular weight of the polymer was determined in terms of polystyrene by GPC (GPC system, made by TOSOH Corporation).

(Yellowness Index YI of Resin):

The yellowness index YI of the resin was measured by dissolving the resin into chloroform to prepare a 15 weight % solution, and then placing this solution into a quartz cell to analyze the solution with transmitted light using a color difference meter (device name: SZ-Σ90, made by Nippon Denshoku Kogyo Co., Ltd.) in accordance with JIS-K-7103.

(Thermal Analysis of Resin):

The thermal analysis of the resin was carried out by TG (device name: TG-8110, made by Rigaku Co., Ltd.) and DSC (device name: DSC-8230, made by Rigaku Co., Ltd.) under the following conditions: amount of sample=about 10 mg, temperature elevation rate=10° C./min, nitrogen flow=50 cc/min. Incidentally, the glass transition temperature (Tg) was determined from the midpoint temperature in accordance with ASTM-D-3418.

(Measurement of Volatile Content in Resin):

The residual volatile content in the resin was measured by gas chromatography (device name: GC-14A, made by Shimadzu Corporation).

(Transparency of Molded Product):

The resultant resin or thermoplastic resin composition was subjected to injection molding (thickness=3.2 mm) to measure the total luminous transmittance and the haze value of the resultant molded product as an index of the transparency with a hazemeter (device name: NDH-1001DP, made by Nippon Denshoku Kogyo Co., Ltd.) in accordance with ASTM-D-1003.

(Confirmation of Lactone Ring in Resin):

Whether a lactone ring was present in the framework of the resin or not was confirmed by infrared absorption spectroscopy and $^{13}$C-NMR. Incidentally, the measurement by the infrared absorption spectroscopy was carried out with an FTS-45 infrared spectrophotometer (made by BIO-RAD), and the measurement by the $^{13}$C-NMR was carried out with FT-NMR UNITY plus400 (made by Varian).

(Heat Resistance):

The heat resistance of the resultant thermoplastic resin composition was evaluated with the glass transition temperature (Tg) as determined by the DSC measurement in the aforementioned thermal analysis of the resin. That is to say, the higher the glass transition temperature is, the more excellent the heat resistance is.

(Miscibility):

The glass transition temperature (Tg) of the resultant thermoplastic resin composition was measured by the aforementioned DSC measurement. A case where the glass transition temperature was observed at only one point was evaluated as "○", and a case where the glass transition temperature was observed at more than one point was evaluated as "×".

(Transparency of Thermoplastic Resin Composition):

A tetrahydrofuran solution of the resultant thermoplastic resin composition was coated into a uniform thickness onto a glass plate and then dried to prepare a cast film. The transparency of this cast film was observed with the eye and evaluated as follows: nonturbid and colorless transparent: "○", white turbid: "×".

(Impact Resistance of Molded Product):

The impact strength (Izod value) was measured as an index of the impact resistance using an Izod impact tester (made by Toyo Seiki Co., Ltd.) in accordance with ASTM-D-256 except that an unnotched test piece, as obtained by injection molding of the resultant resin, was used.

Referential Example 1

Five parts of methyl 2-(hydroxymethyl)acrylate, 20 parts of methyl methacrylate, and 25 parts of toluene were placed into a reaction vessel of 30 liters as equipped with a stirrer, a temperature sensor, a condenser, a nitrogen-introducing tube, and a dropping pump. The temperature was elevated to 100° C. under a nitrogen stream. Then, 0.075 parts of t-butyl peroxyisopropyl carbonate (initiator) was added, and simultaneously therewith, a solution comprising 5 parts of methyl 2-(hydroxymethyl)acrylate, 20 parts of methyl methacrylate, 25 parts of toluene, and 0.075 parts of the initiator was dropwise added over a period of 3.5 hours, while solution polymerization was carried out in the range of 100~110° C. Thereafter, aging was carried out for 1.5 hours. The polymerization conversion was 91.8%, and the content (weight ratio) of methyl 2-(hydroxymethyl)acrylate in the resultant polymer was 20.0%. In addition, the weight-average molecular weight of this polymer was 130,000.

EXAMPLE 1

The polymer solution, resultant from Referential Example 1, was introduced at a treatment rate of 0.7 kg/hour in terms of amount of resin into a vent type twin-screw extruder (Φ=29.75 mm, L/D=30) of: barrel temperature=250° C., revolution number=100 rpm, vacuum=10~300 mmHg (13.3~400 hPa), number of rear vents=1, and number of fore vents=4. A dealcoholation reaction and a devolatilization were carried out in the extruder, and the resultant product was extruded to obtain transparent pellets, of which the yellowness index YI was 2.1.

The dealcoholation conversion of the resultant pellets was determined by the foregoing method, with the result that the dealcoholation conversion was 95.8% (a weight loss of 0.23% was detected in the measurement by the dynamic TG method, and the content of the lactone ring structure as determined by this method was 19.2 weight %). In addition, it was confirmed by the infrared absorption spectroscopy and the $^{13}$C-NMR that lactone rings were formed in the framework of the resultant resin.

In addition, the weight-average molecular weight of the above pellets was 80,000.

In addition, the 5% weight loss temperature, which was an index of the heat resistance, of the above pellets was 366° C. Therefrom, it was found that the above pellets had excellent thermal stability in the high temperature region. Incidentally, the glass transition temperature was 126° C.

In addition, the residual volatile contents in the pellets were as follows:

Methyl methacrylate: 470 ppm
Methyl 2-(hydroxymethyl)acrylate: 50 ppm
Methanol: 280 ppm
Toluene: 90 ppm The above pellets were subjected to injection molding at 250° C. to obtain a colorless transparent molded product (total luminous transmittance: 90.1%, haze value: 2.5%) in which neither foam nor silver streak was seen. In addition, the impact strength (Izod value) was measured to obtain a value of 68.6 N·cm/cm$^2$ (7 kgf·cm/cm$^2$).

These results are collected in Table 1.

EXAMPLE 2

Methyl isobutyl ketone and phenylphosphonic acid were added to the polymer solution resultant from Referential Example 1, wherein the amount of the methyl isobutyl ketone as added was 37.5 parts per 100 parts of the polymer solution, and the amount of the phenylphosphonic acid as added was 0.01 part per 1 part of polymer component. A dealcoholation reaction was carried out at 100° C. for 5 hours under a nitrogen stream.

A portion of the resultant reaction solution was sampled to determine the dealcoholation conversion by the foregoing method, with the result that the dealcoholation conversion was 88.0% (a weight loss of 0.66% was detected in the measurement by the dynamic TG method).

The polymer solution, resultant from the above dealcoholation reaction, was introduced at a treatment rate of 2.0 kg/hour in terms of amount of resin into a vent type twin-screw extruder ($\Phi$=29.75 mm, L/D=30) of: barrel temperature=250° C., revolution number=100 rpm, vacuum=10~300 mmHg (13.3~400 hPa), number of rear vents=1, and number of fore vents=4. A devolatilization treatment was carried out in the extruder while completing the dealcoholation reaction, and the resultant product was extruded to obtain transparent pellets, of which the yellowness index YI was 5.3.

The dealcoholation conversion of the resultant pellets was determined by the foregoing method, with the result that the dealcoholation conversion was 98.4% (a weight loss of 0.09% was detected in the measurement by the dynamic TG method, and the content of the lactone ring structure as determined by this method was 19.7 weight %).

In addition, the weight-average molecular weight of the above pellets was 120,000, and further, the 5% weight loss temperature, which was an index of the heat resistance, of the above pellets was 366° C. Therefrom, it was found that the above pellets had excellent thermal stability in the high temperature region. Incidentally, the glass transition temperature was 134° C.

In addition, the residual volatile contents in the pellets were as follows:

Methyl methacrylate: 60 ppm
Methyl 2-(hydroxymethyl)acrylate: 80 ppm
Methanol: 270 ppm
Toluene: 170 ppm
Methyl isobutyl ketone: 240 ppm The above pellets were subjected to injection molding at 250° C. to stably (continuously) obtain a colorless transparent molded product (total luminous transmittance: 89.8%, haze value: 2.8%) in which neither foam nor silver streak was seen. No foam was seen in the molded product, and further, even if the resin was allowed to reside in an injection molding machine at 250° C. for 5 minutes and then subjected to injection molding, no foam was seen in the resultant molded product. In addition, the impact strength (Izod value) was measured to obtain a value of 157 N·cm/cm$^2$ (16 kgf·cm/cm$^2$).

These results are collected in Table 1.

EXAMPLE 3

The polymer solution, resultant from Referential Example 1, was placed into an autoclave, and the temperature of the solution was then elevated to 200° C., at which the solution was heated under pressure for 10 hours to carry out a dealcoholation reaction.

A portion of the resultant reaction solution was sampled to determine the dealcoholation conversion by the foregoing method, with the result that the dealcoholation conversion was 87.7% (a weight loss of 0.68% was detected in the measurement by the dynamic TG method).

The polymer solution, resultant from the above dealcoholation reaction, was introduced at a treatment rate of 2.0 kg/hour in terms of amount of resin into a vent type twin-screw extruder ($\Phi$=29.75 mm, L/D=30) of: barrel temperature=250° C., revolution number=100 rpm, vacuum=10~300 mmHg (13.3~400 hPa), number of rear vents=1, and number of fore vents=4. A devolatilization treatment was carried out in the extruder while completing the dealcoholation reaction, and the resultant product was extruded to obtain transparent pellets, of which the yellowness index YI was 2.2.

The dealcoholation conversion of the resultant pellets was determined by the foregoing method, with the result that the dealcoholation conversion was 98.0% (a weight loss of 0.11% was detected in the measurement by the dynamic TG method, and the content of the lactone ring structure as determined by this method was 19.6 weight %).

In addition, the weight-average molecular weight of the above pellets was 99,000, and further, the 5% weight loss temperature, which was an index of the heat resistance, of the above pellets was 368° C. Therefrom, it was found that the above pellets had excellent thermal stability in the high temperature region. Incidentally, the glass transition temperature was 130° C.

In addition, the residual volatile contents in the pellets were as follows:

Methyl methacrylate: 90 ppm
Methyl 2-(hydroxymethyl)acrylate: 80 ppm
Methanol: 270 ppm
Toluene: 180 ppm The above pellets were subjected to injection molding at 250° C. to stably (continuously) obtain a colorless transparent molded product (total luminous transmittance: 90.1%, haze value: 2.3%) in which neither foam nor silver streak was seen. No foam was seen in the molded product, and further, even if the resin was allowed to reside in an injection molding machine at 250° C. for 5 minutes and then subjected to injection molding, no foam was seen in the resultant molded product. In addition, the impact strength (Izod value) was measured to obtain a value of 147 N·cm/cm$^2$ (15 kgf·cm/cm$^2$).

These results are collected in Table 1.

EXAMPLE 4

The polymer solution, resultant from Referential Example 1, was caused to pass through a heat exchanger (instead of the twin-screw extruder of Example 1) to elevate the temperature of the solution to 250° C., and then intactly introduced into a devolatilization vessel with a vacuum of 150 mmHg (200 hPa) to carry out a dealcoholation reaction and a devolatilization simultaneously with each other, and the resultant product was extracted with a gear pump at a treatment rate of 1 kg/hour in terms of amount of resin, with the result that a transparent resin was obtained. The yellowness index YI of this resin was 2.1.

The dealcoholation conversion of the resultant resin was determined by the foregoing method, with the result that the dealcoholation conversion was 95.3% (a weight loss of 0.26% was detected in the measurement by the dynamic TG method, and the content of the lactone ring structure as determined by this method was 19.1 weight %).

In addition, the weight-average molecular weight of the above resin was 90,000.

In addition, the 5% weight loss temperature, which was an index of the heat resistance, of the above resin was 363° C. Therefrom, it was found that the above resin had excellent thermal stability in the high temperature region. Incidentally, the glass transition temperature was 126° C.

In addition, the residual volatile contents in the resin were as follows:

Methyl methacrylate: 520 ppm
Methyl 2-(hydroxymethyl)acrylate: 100 ppm
Methanol: 380 ppm
Toluene: 330 ppm The above resin was subjected to injection molding at 250° C. to obtain a colorless transparent molded product (total luminous transmittance: 90.1%, haze value: 2.7%) in which neither foam nor silver streak was seen. In addition, the impact strength (Izod value) was measured to obtain a value of 88.3 N·cm/cm$^2$ (9 kgf·cm/cm$^2$).

These results are collected in Table 1.

EXAMPLE 5

Methyl isobutyl ketone and phenylphosphonic acid were added to the polymer solution resultant from Referential Example 1, wherein the amount of the methyl isobutyl ketone as added was 37.5 parts per 100 parts of the polymer solution, and the amount of the phenylphosphonic acid as added was 0.01 part per 1 part of polymer component. The resultant mixture was introduced at a treatment rate of 2.0 kg/hour in terms of amount of resin into a vent type twin-screw extruder (Φ=29.75 mm, L/D=30) of: barrel temperature=250° C., revolution number=100 rpm, vacuum=10~300 mmHg (13.3~400 hPa), number of rear vents=1, and number of fore vents=4. A dealcoholation reaction and a devolatilization treatment were carried out in the extruder, and the resultant product was extruded to obtain transparent pellets, of which the yellowness index YI was 5.3.

The dealcoholation conversion of the resultant pellets was determined by the foregoing method, with the result that the dealcoholation conversion was 96.7% (a weight loss of 0.18% was detected in the measurement by the dynamic TG method, and the content of the lactone ring structure as determined by this method was 19.3 weight %).

In addition, the weight-average molecular weight of the above pellets was 110,000, and further, the 5% weight loss temperature, which was an index of the heat resistance, of the above pellets was 366° C. Therefrom, it was found that the above pellets had excellent thermal stability in the high temperature region. Incidentally, the glass transition temperature was 133° C.

In addition, the residual volatile contents in the pellets were as follows:

Methyl methacrylate: 80 ppm
Methyl 2-(hydroxymethyl)acrylate: 110 ppm
Methanol: 290 ppm
Toluene: 170 ppm
Methyl isobutyl ketone: 240 ppm The above pellets were subjected to injection molding at 250° C. to stably (continuously) obtain a colorless transparent molded product (total luminous transmittance: 89.8%, haze value: 2.8%) in which neither foam nor silver streak was seen. In addition, the impact strength (Izod value) was measured to obtain a value of 137 N·cm/cm$^2$ (14 kgf·cm/cm$^2$).

These results are collected in Table 1.

EXAMPLE 6

Methyl isobutyl ketone and phenylphosphonous acid were added to the polymer solution resultant from Referential Example 1, wherein the amount of the methyl isobutyl ketone as added was 37.5 parts per 100 parts of the polymer solution, and the amount of the phenylphosphonous acid as added was 0.005 parts per 1 part of polymer component. A dealcoholation reaction was carried out at 100° C. for 5 hours under a nitrogen stream.

A portion of the resultant reaction solution was sampled to determine the dealcoholation conversion by the foregoing method, with the result that the dealcoholation conversion was 88.0% (a weight loss of 0.66% was detected in the measurement by the dynamic TG method) at this point of time.

Next, a devolatilization treatment of the polymer solution, resultant from the above dealcoholation reaction, was carried out in the same way as of Example 2 while completing the dealcoholation reaction, and the resultant product was extruded to obtain transparent pellets.

The dealcoholation conversion of the resultant pellets was determined by the foregoing method, with the result that the dealcoholation conversion was 98.4% (a weight loss of 0.09% was detected in the measurement by the dynamic TG method, and the content of the lactone ring structure as determined by this method was 19.7 weight %). In addition, the yellowness index YI of the above pellets was 1.7.

In addition, the weight-average molecular weight of the above pellets was 120,000, and further, the 5% weight loss temperature, which was an index of the heat resistance, of the above pellets was 367° C. Therefrom, it was found that the above pellets had excellent thermal stability in the high temperature region. Incidentally, the glass transition temperature was 135° C.

In addition, the residual volatile contents in the pellets were as follows:

Methyl methacrylate: 60 ppm
Methyl 2-(hydroxymethyl)acrylate: 70 ppm
Methanol: 190 ppm
Toluene: 160 ppm
Methyl isobutyl ketone: 230 ppm The above pellets were subjected to injection molding at 250° C. to stably (continuously) obtain a colorless transparent molded product (total luminous transmittance: 91.0%, haze value: 2.5%) in which neither foam nor silver streak was seen. No foam was seen in the molded product, and further, even if the resin was allowed to reside in an injection molding machine at 250° C. for 5 minutes and then subjected to injection molding, no foam was seen in the resultant molded product. In addition, the impact strength (Izod value) was measured to obtain a value of 177 N·cm/cm$^2$ (18 kgf·cm/cm$^2$).

These results are collected in Table 2.

EXAMPLE 7

Methyl isobutyl ketone and dimethyl phosphite were added to the polymer solution resultant from Referential Example 1, wherein the amount of the methyl isobutyl ketone as added was 37.5 parts per 100 parts of the polymer solution, and the amount of the dimethyl phosphite as added was 0.015 parts per 1 part of polymer component. A dealcoholation reaction was carried out at 100° C. for 5 hours under a nitrogen stream.

A portion of the resultant reaction solution was sampled to determine the dealcoholation conversion by the foregoing method, with the result that the dealcoholation conversion was 86.8% (a weight loss of 0.73% was detected in the measurement by the dynamic TG method) at this point of time.

Next, a devolatilization treatment of the polymer solution, resultant from the above dealcoholation reaction, was carried out in the same way as of Example 2 while completing the dealcoholation reaction, and the resultant product was extruded to obtain transparent pellets.

The dealcoholation conversion of the resultant pellets was determined by the foregoing method, with the result that the dealcoholation conversion was 97.1% (a weight loss of 0.16% was detected in the measurement by the dynamic TG method, and the content of the lactone ring structure as determined by this method was 19.4 weight %). In addition, the yellowness index YI of the above pellets was 1.5.

In addition, the weight-average molecular weight of the above pellets was 117,000, and further, the 5% weight loss temperature, which was an index of the heat resistance, of the above pellets was 365° C. Therefrom, it was found that the above pellets had excellent thermal stability in the high temperature region. Incidentally, the glass transition temperature was 135° C.

In addition, the residual volatile contents in the pellets were as follows:

Methyl methacrylate: 80 ppm
Methyl 2-(hydroxymethyl)acrylate: 90 ppm
Methanol: 290 ppm
Toluene: 170 ppm
Methyl isobutyl ketone: 240 ppm The above pellets were subjected to injection molding at 250° C. to stably (continuously) obtain a colorless transparent molded product (total luminous transmittance: 90.9%, haze value: 1.5%) in which neither foam nor silver streak was seen. No foam was seen in the molded product, and further, even if the resin was allowed to reside in an injection molding machine at 250° C. for 5 minutes and then subjected to injection molding, no foam was seen in the resultant molded product. In addition, the impact strength (Izod value) was measured to obtain a value of 167 N·cm/cm2 (17 kgf·cm/cm$^2$).

These results are collected in Table 2.

EXAMPLE 8

Methyl isobutyl ketone and a methyl phosphate/dimethyl phosphate mixture (made by Tokyo Kasei Kogyo Co., Ltd.) were added to the polymer solution resultant from Referential Example 1, wherein the amount of the methyl isobutyl ketone as added was 37.5 parts per 100 parts of the polymer solution, and the amount of the methyl phosphate/dimethyl phosphate mixture as added was 0.001 part per 1 part of polymer component. A dealcoholation reaction was carried out at 100° C. for 5 hours under a nitrogen stream.

A portion of the resultant reaction solution was sampled to determine the dealcoholation conversion by the foregoing method, with the result that the dealcoholation conversion was 88.8% (a weight loss of 0.62% was detected in the measurement by the dynamic TG method) at this point of time.

Next, a devolatilization treatment of the polymer solution, resultant from the above dealcoholation reaction, was carried out in the same way as of Example 2 while completing the dealcoholation reaction, and the resultant product was extruded to obtain transparent pellets.

The dealcoholation conversion of the resultant pellets was determined by the foregoing method, with the result that the dealcoholation conversion was 98.2% (a weight loss of 0.10% was detected in the measurement by the dynamic TG method, and the content of the lactone ring structure as determined by this method was 19.6 weight %). In addition, the yellowness index YI of the above pellets was 0.8.

In addition, the weight-average molecular weight of the above pellets was 120,000, and further, the 5% weight loss temperature, which was an index of the heat resistance, of the above pellets was 366° C. Therefrom, it was found that the above pellets had excellent thermal stability in the high temperature region. Incidentally, the glass transition temperature was 134° C.

In addition, the residual volatile contents in the pellets were as follows:

Methyl methacrylate: 50 ppm
Methyl 2-(hydroxymethyl)acrylate: 60 ppm
Methanol: 240 ppm
Toluene: 170 ppm
Methyl isobutyl ketone: 250 ppm The above pellets were subjected to injection molding at 250° C. to stably (continuously) obtain a colorless transparent molded product (total luminous transmittance: 92.5%, haze value: 0.7%) in which neither foam nor silver streak was seen. No foam was seen in the molded product, and further, even if the resin was allowed to reside in an injection molding machine at 250° C. for 5 minutes and then subjected to injection molding, no foam was seen in the resultant molded product. In addition, the impact strength (Izod value) was measured to obtain a value of 177 N·cm/cm$^2$ (18 kgf·cm/cm$^2$).

These results are collected in Table 2.

EXAMPLE 9

Methyl isobutyl ketone and p-toluenesulfonic acid monohydrate were added to the polymer solution resultant from Referential Example 1, wherein the amount of the methyl isobutyl ketone as added was 37.5 parts per 100 parts of the polymer solution, and the amount of the p-toluenesulfonic acid monohydrate as added was 0.005 parts per 1 part of polymer component. A dealcoholation reaction was carried out at 100° C. for 5 hours under a nitrogen stream.

A portion of the resultant reaction solution was sampled to determine the dealcoholation conversion by the foregoing method, with the result that the dealcoholation conversion was 88.8% (a weight loss of 0.62% was detected in the measurement by the dynamic TG method) at this point of time.

Next, a devolatilization treatment of the polymer solution, resultant from the above dealcoholation reaction, was carried out in the same way as of Example 2 while completing the dealcoholation reaction, and the resultant product was extruded to obtain transparent pellets.

The dealcoholation conversion of the resultant pellets was determined by the foregoing method, with the result that the dealcoholation conversion was 98.4% (a weight loss of 0.09% was detected in the measurement by the dynamic TG method, and the content of the lactone ring structure as determined by this method was 19.7 weight %). In addition, the yellowness index YI of the above pellets was 11.8.

In addition, the weight-average molecular weight of the above pellets was 120,000, and further, the 5% weight loss temperature, which was an index of the heat resistance, of the above pellets was 365° C. Therefrom, it was found that the above pellets had excellent thermal stability in the high temperature region. Incidentally, the glass transition temperature was 135° C.

In addition, the residual volatile contents in the pellets were as follows:

Methyl methacrylate: 60 ppm
Methyl 2-(hydroxymethyl)acrylate: 70 ppm
Methanol: 280 ppm
Toluene: 160 ppm
Methyl isobutyl ketone: 230 ppm The above pellets were subjected to injection molding at 250° C. to stably (continuously) obtain a colored transparent molded product (total luminous transmittance: 86.5%, haze value: 5.5%) in which neither foam nor silver streak was seen. No foam was seen in the molded product, and further, even if the resin was allowed to reside in an injection molding machine at 250° C. for 5 minutes and then subjected to injection molding, no foam was seen in the resultant molded product. In addition, the impact strength (Izod value) was measured to obtain a value of 167 N·cm/cm$^2$ (17 kgf·cm/cm$^2$).

These results are collected in Table 2.

Comparative Example 1

The polymer solution, resultant from Referential Example 1, was diluted with tetrahydrofuran and then added into an excess of hexane to carry out reprecipitation. The separated precipitate was dried under vacuum (at 1 mmHg (1.33 hPa), 80° C. for 3 hours), and 10 parts of the resultant white solid resin was dissolved into 60 parts of DMSO and then heated at 150° C. for 1 hour. After being cooled, the reaction solution was diluted with tetrahydrofuran and then added into an excess of methanol to carry out reprecipitation. The separated precipitate was dried under vacuum (at 1 mmHg (1.33 hPa), 80° C. for 3 hours) to obtain a white solid resin.

The dealcoholation conversion of the resultant resin was determined by the foregoing method, with the result that the dealcoholation conversion was 44.2% (a weight loss of 3.08% was detected in the measurement by the dynamic TG method, and the content of the lactone ring structure as determined by this method was 8.8 weight %).

The above resin was subjected to injection molding at 220° C. or 250° C., with the result that considerably much foam and silver streak were, however, seen in the molded product.

These results are collected in Table 3.

Comparative Example 2

The polymer solution, resultant from Referential Example 1, was diluted with tetrahydrofuran and then added into an excess of hexane to carry out reprecipitation. The separated precipitate was dried under vacuum (at 1 mmHg (1.33 hPa), 80° C. for 3 hours), and 10 parts of the resultant white solid resin was dissolved into 60 parts of DMSO and then heated at 170° C. for 10 hours. After being cooled, the reaction solution was diluted with tetrahydrofuran and then added into an excess of methanol to carry out reprecipitation. The separated precipitate was dried under vacuum (at 1 mmHg (1.33 hPa), 80° C. for 3 hours) to obtain a white solid resin.

The dealcoholation conversion of the resultant resin was determined by the foregoing method, with the result that the dealcoholation conversion was 88.0% (a weight loss of 0.66% was detected in the measurement by the dynamic TG method, and the content of the lactone ring structure as determined by this method was 17.6 weight %).

The above resin was subjected to injection molding at 220° C. or 250° C., with the result that considerably much foam and silver streak were, however, seen in the molded product.

These results are collected in Table 3.

Comparative Example 3

The polymer solution, resultant from Referential Example 1, was diluted with tetrahydrofuran and then added into an excess of hexane to carry out reprecipitation. The separated precipitate was dried under vacuum (at 1 mmHg (1.33 hPa), 80° C. for 3 hours), and 10 parts of the resultant white solid resin was dissolved into 60 parts of DMSO. To the resultant solution, 0.5 parts of p-toluenesulfonic acid monohydrate was added, and the resultant mixture was heated at 50° C. for 6 hours. After being cooled, the reaction solution was diluted with tetrahydrofuran and then added into an excess of methanol to carry out reprecipitation. The separated precipitate was dried under vacuum (at 1 mmHg (1.33 hPa), 80° C. for 3 hours) to obtain a white solid resin.

The dealcoholation conversion of the resultant resin was determined by the foregoing method, with the result that the dealcoholation conversion was 84.6% (a weight loss of 0.85% was detected in the measurement by the dynamic TG method, and the content of the lactone ring structure as determined by this method was 16.9 weight %).

The above resin was subjected to injection molding at 220° C. or 250° C., with the result that considerably much foam and silver streak were, however, seen in the molded product.

These results are collected in Table 3.

Referential Example 2

A polymerization reaction was carried out in the same way as of Referential Example 1 except that the amount of the methyl 2-(hydroxymethyl)acrylate was changed to 10 parts, and that the amount of the methyl methacrylate was changed to 15 parts. The polymerization conversion was 93.2%, and the content (weight ratio) of methyl 2-(hydroxymethyl)acrylate in the resultant polymer was 40.2%. In addition, the weight-average molecular weight of this polymer was 117,000.

EXAMPLE 10

A dealcoholation reaction and a devolatilization of the polymer solution, resultant from Referential Example 2, were carried out in the same way as of Example 1, and the resultant product was extruded to obtain transparent pellets, of which the yellowness index YI was 1.9.

The dealcoholation conversion of the resultant pellets was determined by the foregoing method, with the result that the dealcoholation conversion was 95.1% (a weight loss of 0.54% was detected in the measurement by the dynamic TG method, and the content of the lactone ring structure as determined by this method was 38.2 weight %).

In addition, the weight-average molecular weight of the above pellets was 42,000.

In addition, the 5% weight loss temperature, which was an index of the heat resistance, of the above pellets was 350° C. Therefrom, it was found that the above pellets had excellent thermal stability in the high temperature region. Incidentally, the glass transition temperature was 141° C.

In addition, the residual volatile contents in the pellets were as follows:

Methyl methacrylate: 520 ppm
Methyl 2-(hydroxymethyl)acrylate: 60 ppm
Methanol: 690 ppm
Toluene: 90 ppm The above pellets were subjected to injection molding at 250° C. to obtain a colorless transparent molded product (total luminous transmittance: 90.1%, haze value: 2.5%) in which neither foam nor silver streak was seen. In addition, the impact strength (Izod value) was measured to obtain a value of 49 N·cm/cm$^2$ (5 kgf·cm/cm$^2$).

These results are collected in Table 3.

EXAMPLE 11

Methyl ethyl ketone and phenylphosphonous acid were added to the polymer solution resultant from Referential Example 2, wherein the amount of the methyl ethyl ketone as added was 37.5 parts per 100 parts of the polymer solution, and the amount of the phenylphosphonous acid as added was 0.01 part per 1 part of polymer component. A dealcoholation reaction was carried out at 90° C. for 5 hours under a nitrogen stream.

A portion of the resultant reaction solution was sampled to determine the dealcoholation conversion by the foregoing method, with the result that the dealcoholation conversion was 88.0% (a weight loss of 1.33% was detected in the measurement by the dynamic TG method).

The polymer solution, resultant from the above dealcoholation reaction, was introduced at a treatment rate of 2.0 kg/hour in terms of amount of resin into a vent type twin-screw extruder (Φ=29.75 mm, L/D=30) of: barrel temperature=250° C., revolution number=100 rpm, vacuum=10~300 mmHg (13.3~400 hPa), number of rear vents=1, and number of fore vents=4. A devolatilization treatment was carried out in the extruder while completing the dealcoholation reaction, and the resultant product was extruded to obtain transparent pellets, of which the yellowness index YI was 2.0.

The dealcoholation conversion of the resultant pellets was determined by the foregoing method, with the result that the dealcoholation conversion was 97.6% (a weight loss of 0.27% was detected in the measurement by the dynamic TG method, and the content of the lactone ring structure as determined by this method was 39.2 weight %).

In addition, the weight-average molecular weight of the above pellets was 80,000.

In addition, the 5% weight loss temperature, which was an index of the heat resistance, of the above pellets was 355° C. Therefrom, it was found that the above pellets had excellent thermal stability in the high temperature region. Incidentally, the glass transition temperature was 155° C.

In addition, the residual volatile contents in the pellets were as follows:

Methyl methacrylate: 70 ppm
Methyl 2-(hydroxymethyl)acrylate: 80 ppm
Methanol: 330 ppm
Toluene: 170 ppm
Methyl ethyl ketone: 200 ppm The above pellets were subjected to injection molding at 250° C. to stably (continuously) obtain a colorless transparent molded product (total luminous transmittance: 89.8%, haze value: 3.0%) in which neither foam nor silver streak was seen. In addition, the impact strength (Izod value) was measured to obtain a value of 118 N·cm/cm$^2$ (12 kgf·cm/cm$^2$).

These results are collected in Table 3.

Comparative Example 4

The polymer solution, resultant from Referential Example 2, was diluted with tetrahydrofuran and then added into an excess of hexane to carry out reprecipitation. The separated precipitate was dried under vacuum (at 1 mmHg (1.33 hPa), 80° C. for 3 hours), and 10 parts of the resultant white solid resin was dissolved into 60 parts of DMSO. To the resultant solution, 0.5 parts of p-toluenesulfonic acid monohydrate was added, and the resultant mixture was heated at 50° C. for 6 hours. After being cooled, the reaction solution was diluted with tetrahydrofuran and then added into an excess of methanol to carry out reprecipitation. The separated precipitate was dried under vacuum (at 1 mmHg (1.33 hPa), 80° C. for 3 hours) to obtain a white solid resin.

The dealcoholation conversion of the resultant resin was determined by the foregoing method, with the result that the dealcoholation conversion was 84.0% (a weight loss of 1.77% was detected in the measurement by the dynamic TG method, and the content of the lactone ring structure as determined by this method was 33.8 weight %).

The above resin was subjected to injection molding at 220° C. or 250° C., with the result that considerably much foam and silver streak were, however, seen in the molded product.

These results are collected in Table 3.

Referential Example 3

A polymerization reaction was carried out in the same way as of Referential Example 1 except that the amount of the methyl 2-(hydroxymethyl)acrylate was changed to 2.5 parts, and that the amount of the methyl methacrylate was changed to 22.5 parts. The polymerization conversion was 91.6%, and the content (weight ratio) of methyl 2-(hydroxymethyl)acrylate in the resultant polymer was 10.5%. In addition, the weight-average molecular weight of this polymer was 138,000.

EXAMPLE 12

Methyl isobutyl ketone and phenylphosphonous acid were added to the polymer solution resultant from Referential Example 3, wherein the amount of the methyl isobutyl ketone as added was 37.5 parts per 100 parts of the polymer solution, and the amount of the phenylphosphonous acid as added was 0.001 part per 1 part of polymer component. A dealcoholation reaction was carried out at 100° C. for 5 hours under a nitrogen stream.

A portion of the resultant reaction solution was sampled to determine the dealcoholation conversion by the foregoing method, with the result that the dealcoholation conversion was 87.2% (a weight loss of 0.37% was detected in the measurement by the dynamic TG method) at this point of time.

A devolatilization treatment of the polymer solution, resultant from the above dealcoholation reaction, was carried out in the extruder in the same way as of Example 2 while completing the dealcoholation reaction, and the resultant product was extruded to obtain transparent pellets, of which the yellowness index YI was 1.5.

The dealcoholation conversion of the resultant pellets was determined by the foregoing method, with the result that the dealcoholation conversion was 97.2% (a weight loss of 0.08% was detected in the measurement by the dynamic TG method, and the content of the lactone ring structure as determined by this method was 10.2 weight %).

In addition, the weight-average molecular weight of the above pellets was 125,000.

Furthermore, the 5% weight loss temperature, which was an index of the heat resistance, of the above pellets was 361° C. Therefrom, it was found that the above pellets had excellent thermal stability in the high temperature region. Incidentally, the glass transition temperature was 125° C.

In addition, the residual volatile contents in the pellets were as follows:

Methyl methacrylate: 90 ppm
Methyl 2-(hydroxymethyl)acrylate: 50 ppm
Methanol: 210 ppm
Toluene: 170 ppm
Methyl isobutyl ketone: 220 ppm The above pellets were subjected to injection molding at 250° C. to stably (continuously) obtain a colorless transparent molded product (total luminous transmittance: 91.4%, haze value: 1.9%) in which neither foam nor silver streak was seen. No foam was seen in the molded product, and further, even if the resin was allowed to reside in an injection molding machine at 250° C. for 5 minutes and then subjected to injection molding, no foam was seen in the resultant molded product. In addition, the impact strength (Izod value) was measured to obtain a value of 226 N·cm/cm$^2$ (23 kgf·cm/cm$^2$).

These results are collected in Table 3.

TABLE 1

|  |  | Example 1 | Example 2 | Example 3 | Example 4 | Example 5 |
|---|---|---|---|---|---|---|
| Properties of pellets | Dealcoholation conversion (%) | 95.8 | 98.4 | 98.0 | 95.3 | 96.7 |
|  | YI | 2.1 | 5.3 | 2.2 | 2.1 | 5.3 |
|  | Weight-average molecular weight | 80,000 | 120,000 | 99,000 | 90,000 | 110,000 |
|  | 5% weight loss temperature (° C.) | 366 | 366 | 368 | 363 | 366 |
|  | Glass transition temperature (° C.) | 126 | 134 | 130 | 126 | 133 |
| Residual volatile contents (ppm) | MMA | 470 | 60 | 90 | 520 | 80 |
|  | MHMA | 50 | 80 | 80 | 100 | 110 |
|  | MeOH | 280 | 270 | 270 | 380 | 290 |
|  | Tol | 90 | 170 | 180 | 330 | 170 |
|  | MIBK | — | 240 | — | — | 240 |
|  | MEK | — | — | — | — | — |
| Properties of molded product | Foam or silver streak | None | None | None | None | None |
|  | Total luminous transmittance (%) | 90.1 | 89.8 | 90.1 | 90.1 | 89.8 |
|  | Haze value (%) | 2.5 | 2.8 | 2.3 | 2.7 | 2.8 |
| Izod value (N · cm/cm$^2$) |  | 68.6 | 157 | 147 | 88.3 | 137 |

MMA: methyl methacrylate,
MHMA: methyl (2-hydroxymethyl)acrylate,
MeOH: methanol,
Tol: toluene,
MIBK: methyl isobutyl ketone,
MEK: methyl ethyl ketone

TABLE 2

|  |  | Example 6 | Example 7 | Example 8 | Example 9 |
|---|---|---|---|---|---|
| Properties of pellets | Dealcoholation conversion (%) | 98.4 | 97.1 | 98.2 | 98.4 |
|  | YI | 1.7 | 1.5 | 0.8 | 11.8 |
|  | Weight-average molecular weight | 120,000 | 117,000 | 120,000 | 120,000 |
|  | 5% weight loss temperature (° C.) | 367 | 365 | 366 | 365 |
|  | Glass transition temperature (° C.) | 135 | 135 | 134 | 135 |
| Residual volatile contents (ppm) | MMA | 60 | 80 | 50 | 60 |
|  | MHMA | 70 | 90 | 60 | 70 |
|  | MeOH | 190 | 290 | 240 | 280 |
|  | Tol | 160 | 170 | 170 | 160 |
|  | MIBK | 230 | 240 | 250 | 230 |
|  | MEK | — | — | — | — |
| Properties of molded product | Foam or silver streak | None | None | None | None |
|  | Total luminous transmittance (%) | 91.0 | 90.9 | 92.5 | 86.5 |
|  | Haze value (%) | 2.5 | 1.5 | 0.7 | 5.5 |
| Izod value (N · cm/cm$^2$) |  | 177 | 167 | 177 | 167 |

MMA: methyl methacrylate,
MHMA: methyl (2-hydroxymethyl)acrylate,
MeOH: methanol,
Tol: toluene,
MIBK: methyl isobutyl ketone,
MEK: methyl ethyl ketone

TABLE 3

| | | Example 10 | Example 11 | Example 12 | Comparative Example 1 | Comparative Example 2 | Comparative Example 3 | Comparative Example 4 |
|---|---|---|---|---|---|---|---|---|
| Properties of pellets | Dealcoholation conversion (%) | 95.1 | 97.6 | 97.2 | 44.2 | 88.0 | 84.6 | 84.0 |
| | YI | 1.9 | 2.0 | 1.5 | 0.4 | 0.7 | 1.2 | 1.2 |
| | Weight-average molecular weight | 42,000 | 80,000 | 125,000 | 130,000 | 127,000 | 132,000 | 118,000 |
| | 5% weight loss temperature (° C.) | 350 | 355 | 361 | 304 | 323 | 316 | 310 |
| | Glass transition temperature (° C.) | 141 | 155 | 125 | 128 | 132 | 130 | 142 |
| | Residual volatile contents (ppm) MMA | 520 | 70 | 90 | — | — | — | — |
| | MHMA | 60 | 80 | 50 | — | — | — | — |
| | MeOH | 690 | 330 | 210 | — | — | — | — |
| | Tol | 90 | 170 | 170 | — | — | — | — |
| | MIBK | — | — | 220 | — | — | — | — |
| | MEK | — | 200 | — | — | — | — | — |
| Properties of molded product | Foam or silver streak | None | None | None | Much | Much | Much | Much |
| | Total luminous transmittance (%) | 90.1 | 89.8 | 91.4 | — | — | — | — |
| | Haze value (%) | 2.5 | 3.0 | 1.9 | — | — | — | — |
| | Izod value (N · cm/cm$^2$) | 49 | 118 | 226 | — | — | — | — |

MMA: methyl methacrylate,
MHMA: methyl (2-hydroxymethyl)acrylate,
MeOH: methanol,
Tol: toluene,
MIBK: methyl isobutyl ketone,
MEK: methyl ethyl ketone Also from analyses such as thermal analysis of dynamic TG, $^{13}$C-NMR, and IR, it could be confirmed that the transparent heat-resistant resin, as obtained by the production process according to the present invention, is a transparent heat-resistant resin in which an expected amount of lactone ring structure is introduced. In addition, the dealcoholation conversions in the Examples, in which the production process according to the present invention was employed, were all high.

EXAMPLES 13 to 17 and Comparative Examples 5, 6

The pellets resultant from Example 1 (hereinafter referred to as pellets (A-1)) and the pellets resultant from Example 10 (hereinafter referred to as pellets (A-2)) were used, and further, a vinyl chloride resin and an acrylonitrile-styrene resin (AS resin) were used as thermoplastic resins (B). These were dissolved into tetrahydrofuran in the mixing ratios (by weight) of Table 4, and the resultant solutions were dropwise added into methanol. The resultant reprecipitated white solids were subjected to suction filtration and then dried to obtain thermoplastic resin compositions. The properties of the resultant thermoplastic resin compositions are shown in Table 4.

TABLE 4

| | Example 13 | Example 14 | Example 15 | Example 16 | Example 17 | Comparative Example 5 | Comparative Example 6 |
|---|---|---|---|---|---|---|---|
| A-1 | 20 | 40 | 60 | — | 20 | — | — |
| A-2 | — | — | — | 20 | — | — | — |
| AS resin | 80 | 60 | 40 | 80 | — | 100 | — |
| Vinyl chloride resin | — | — | — | — | 80 | — | 100 |
| Heat resistance (° C.) | 114 | 119 | 123 | 115 | 92 | 110 | 84 |
| Miscibility | ○ | ○ | ○ | ○ | ○ | — | — |
| Haze value (%) | 1.0 | 1.1 | 1.1 | 1.2 | 1.1 | 1.0 | 1.1 |
| Transparency | ○ | ○ | ○ | ○ | ○ | ○ | ○ |

EXAMPLES 18 to 20 and Comparative Example 7

The aforementioned pellets (A-1) were used, and further, an acrylonitrile-styrene resin (AS resin) and an acrylonitrile-butadiene-styrene resin (ABS resin) were used as thermoplastic resins (B). These were mixed in the mixing ratios (by weight) of Table 5 with an omnimixer, and the resultant mixtures were melt-kneaded with a twin-screw extruder of 30 mm φ having a cylinder temperature as controlled to 240° C., thus obtaining thermoplastic resin compositions. The properties of the resultant thermoplastic resin compositions are shown in Table 5.

TABLE 5

|  | Example 18 | Example 19 | Example 20 | Comparative Example 7 |
|---|---|---|---|---|
| A-1 | 10 | 20 | 40 | — |
| AS resin | 90 | 20 | — | — |
| ABS resin | — | 60 | 60 | 100 |
| Heat resistance (° C.) | 112 | 111 | 114 | 105 |
| Miscibility | ○ | ○ | ○ | — |
| Haze value (%) | 1.0 | *1 | *1 | *1 |
| Transparency | ○ | *1 | *1 | *1 |

*1: Unmeasured because the ABS resin itself was opaque.

EXAMPLES 21 to 27

The pellets, resultant from Example 6, and a thermoplastic resin, as selected from the group consisting of an acrylonitrile-styrene resin (AS resin), a vinyl chloride resin, and an acrylonitrile-butadiene-styrene resin (ABS resin), were mixed in the mixing ratios (by weight) of Tables 6 and 7 with an omnimixer, and the resultant mixtures were melt-kneaded with a twin-screw extruder of 30 mm φ having a cylinder temperature as controlled to 240° C., thus obtaining transparent heat-resistant resin compositions. The properties of the resultant transparent heat-resistant resin compositions were evaluated by being measured in the aforementioned ways. The results are shown in Tables 6 and 7 along with those of Comparative Examples 5 to 7 above for comparison.

TABLE 6

|  | Example 21 | Example 22 | Example 23 | Example 24 | Example 25 |
|---|---|---|---|---|---|
| Pellets of Example 6 | 20 | 40 | 60 | 20 | 10 |
| AS resin | 80 | 60 | 40 | — | 90 |
| Vinyl chloride resin | — | — | — | 80 | — |
| ABS resin | — | — | — | — | — |
| Heat resistance (° C.) | 116 | 122 | 127 | 96 | 113 |
| Miscibility | ○ | ○ | ○ | ○ | ○ |
| Haze value (%) | 1.2 | 1.3 | 1.5 | 1.3 | 1.1 |
| Transparency | ○ | ○ | ○ | ○ | ○ |

TABLE 7

|  | Example 26 | Example 27 | Comparative Example 5 | Comparative Example 6 | Comparative Example 7 |
|---|---|---|---|---|---|
| Pellets of Example 6 | 20 | 40 | — | — | — |
| AS resin | 20 | — | 100 | — | — |
| Vinyl chloride resin | — | — | — | 100 | — |
| ABS resin | 60 | 60 | — | — | 100 |
| Heat resistance (° C.) | 114 | 118 | 110 | 84 | 105 |
| Miscibility | ○ | ○ | — | — | — |
| Haze value (%) | *1 | *1 | 1.0 | 1.1 | *1 |
| Transparency | *1 | *1 | ○ | ○ | *1 |

*1: Unmeasured because the ABS resin itself was opaque.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A production process for a transparent heat-resistant resin comprising a polymer (A) having a lactone ring structure, wherein the resin has a dealcoholation conversion of not lower than 90% as determined from a weight loss between 150 and 300° C. in dynamic thermogravimetric (TG) measurement, wherein the resin has a yellowness index (YI) of not more than 6 in a 15 weight % chloroform solution, with the production process comprising the steps of:
   a) obtaining a polymer (B) having a hydroxyl group and an ester group in its molecular chain by a polymerization step having a solvent and monomers, wherein the monomers include a monomer having both a hydroxyl group and an ester group and the monomer having both a hydroxyl group and an ester group makes up as a monomer unit from 5 to 60 weight % of polymer (B), wherein a number of atoms present in the molecular chain between the hydroxyl group and the ester group of polymer (B) is no larger than 6;
   b) running a dealcoholation reaction of polymer (B) to obtain polymer (A) by forming a lactone ring structure by a condensation cyclization of at least part of the hydroxyl group and at least part of the ester group; and
   c) running a devolatilization step during the dealcoholation reaction in the presence of the solvent that was present in the polymerization step without entirely removing the solvent from polymer (B).

2. A production process for a transparent heat-resistant resin comprising a polymer (A) having a lactone ring structure, wherein the resin has a weight-average molecular weight of 40,000–300,000, wherein the resin has a yellowness index (YI) of not more than 6 in a 15 weight % chloroform solution, with the production process comprising the steps of:
   a) obtaining a polymer (B) having a hydroxyl group and an ester group in its molecular chain by a polymerization step having a solvent and monomers, wherein the monomers include a monomer having both a hydroxyl group and an ester group and the monomer having both a hydroxyl group and an ester group makes up as a monomer unit from 5 to 60 weight % of polymer (B), wherein a number of atoms present in the molecular chain between the hydroxyl group and the ester group of polymer (B) is no larger than 6;
   b) running a dealcoholation reaction of polymer (B) to obtain polymer (A) by forming a lactone ring structure by a condensation cyclization of at least part of the hydroxyl group and at least part of the ester group; and
   c) running a devolatilization step during the dealcoholation reaction in the presence of the solvent that was present in the polymerization step without entirely removing the solvent from polymer (B).

3. A production process for a transparent heat-resistant resin comprising a polymer (A) having a lactone ring structure, wherein the resin has a total luminous transmittance of not lower than 85% when in a form of a molded product by injection molding, wherein the resin has a yellowness index (YI) of not more than 6 in a 15 weight % chloroform solution, with the production process comprising the steps of:

a) obtaining a polymer (B) having a hydroxyl group and an ester group in its molecular chain by a polymerization step having a solvent and monomers, wherein the monomers include a monomer having both a hydroxyl group and an ester group and the monomer having both a hydroxyl group and an eater group makes up as a monomer unit from 5 to 60 weight % of polymer (B), wherein a number of atoms present in the molecular chain between the hydroxyl group and the ester group of polymer (B) is no larger than 6;

b) running a dealcoholation reaction of polymer (B) to obtain polymer (A) by forming a lactone ring structure by a condensation cyclization of at least part of the hydroxyl group and at least part of the ester group; and c) running a devolatilization step during the dealcoholation reaction in the presence of the solvent that was present in the polymerization step without entirely removing the solvent from polymer (B).

4. A production process for a transparent heat-resistant resin comprising a polymer (A) having a lactone ring structure, wherein the resin has a haze value of not higher than 5% in a form of a molded product by injection molding, wherein the resin has a yellowness index (YI) of not more than 6 in a 15 weight % chloroform solution, with the production process comprising the steps of:

a) obtaining a polymer (B) having a hydroxyl group and an ester group in its molecular chain by a polymerization step having a solvent and monomers, wherein the monomers include a monomer having both a hydroxyl group and an ester group and the monomer having both a hydroxyl group and an ester group makes up as a monomer unit from 5 to 60 weight % of polymer (B), wherein a number of atoms present in the molecular chain between the hydroxyl group and the ester group of polymer (B) is no larger than 6;

b) running a dealcoholation reaction of polymer (B) to obtain polymer (A) by forming a lactone ring structure by a condensation cyclization of at least part of the hydroxyl group and at least part of the ester group; and c) running a devolatilization step during the dealcoholation reaction in the presence of the solvent that was present in the polymerization step without entirely removing the solvent from polymer (B).

5. A production process according to claim 1, and further comprising the step of initiating the devolatilization step at an interval after the dealcoholation step has been initiated.

6. A production process according to claim 1, and further comprising the step of initiating the devolatilization step at a time when said dealcoholation conversion is not lower than 60%.

7. A production process according to claim 1, and further comprising the step of running the dealcoholation reaction of polymer (B) with a vessel reactor.

8. A production process according to claim 1, and further comprising the step of running the dealcoholation reaction of polymer (B) with an organophosphorus compound as a catalyst.

9. A production process according to claim 8, and further comprising the step of selecting the organophosphorus compound from the group consisting of alkylphosphonous acids, arylphosphonous acids, alkylphosphonic acids, arylphosphinic acids, phosphite diesters or monoesters, phosphate diesters or monoesters, alkylphosphonic acids, and arylphosphinic acids.

* * * * *